United States Patent [19]

Takeda

[11] Patent Number: 5,469,561
[45] Date of Patent: Nov. 21, 1995

[54] APPARATUS AND METHOD FOR CONTROLLING THE RUNNING OF A DATA PROCESSING APPARATUS

[75] Inventor: Koji Takeda, Suwa, Japan

[73] Assignee: Seiko Epson Corporation, Tokyo, Japan

[21] Appl. No.: 995,310

[22] Filed: Dec. 22, 1992

Related U.S. Application Data

[63] Continuation of Ser. No. 355,730, May 23, 1989, abandoned.

[30] Foreign Application Priority Data

| May 27, 1988 | [JP] | Japan | 63-130533 |
| Sep. 19, 1988 | [JP] | Japan | 63-234003 |
| Sep. 27, 1988 | [JP] | Japan | 63-241604 |

[51] Int. Cl.⁶ .................................................. G06F 1/04
[52] U.S. Cl. ........................ 395/550; 364/916; 364/934.3; 364/DIG. 2
[58] Field of Search ............................................. 395/550

[56] References Cited

U.S. PATENT DOCUMENTS

| 3,812,472 | 5/1974 | Mahood . | |
| 4,136,383 | 1/1979 | Takesue . | |
| 4,366,540 | 12/1982 | Berglund et al. . | |
| 4,393,464 | 7/1983 | Knapp et al. . | |
| 4,507,732 | 3/1985 | Catiller | 364/200 |
| 4,509,120 | 4/1985 | Daudelin | 364/200 |
| 4,631,702 | 12/1986 | Korba | 364/900 |
| 4,677,433 | 6/1987 | Catlin et al. | 340/825.2 |
| 4,748,559 | 5/1988 | Smith et al. . | |
| 4,805,199 | 2/1989 | Muramatsu | 377/39 |
| 4,819,164 | 4/1989 | Branson | 364/200 |
| 4,835,681 | 5/1989 | Culley . | |
| 4,864,160 | 9/1989 | Abdoo | 364/569 |
| 4,893,271 | 1/1990 | Davis et al. . | |
| 4,947,411 | 8/1990 | Shiraishi et al. | 377/47 |
| 4,980,854 | 12/1990 | Donaldson et al. | 395/325 |
| 5,025,387 | 6/1991 | Frane . | |
| 5,097,437 | 3/1992 | Larson | 395/775 |
| 5,125,088 | 6/1992 | Culley . | |
| 5,151,986 | 9/1992 | Langan et al. . | |
| 5,159,679 | 10/1992 | Culley . | |
| 5,163,146 | 11/1992 | Antanaitis, Jr. et al. . | |
| 5,179,667 | 1/1993 | Iyer . | |
| 5,254,888 | 10/1993 | Lee et al. . | |

FOREIGN PATENT DOCUMENTS

| 58-87611 | 5/1983 | Japan . | |
| 59-208589 | 11/1984 | Japan . | |
| 62-221061 | 9/1987 | Japan . | |
| 63-311554 | 12/1988 | Japan . | |
| 1-293416 | 11/1989 | Japan . | |
| 2-5133 | 1/1990 | Japan . | |
| 2-137009 | 5/1990 | Japan . | |
| 2-141861 | 5/1990 | Japan . | |
| 2181578 | 4/1987 | United Kingdom | G06F 1/04 |

OTHER PUBLICATIONS

Microprocessor Bus Cycle Stretcher by J. P. Buonomo, Sr. and H. Dwyer, III, IBM Technical Disclosure Bulletin No. 3, vol. 23, Aug. 1980, p. 984.
Datum By CQ Publishing Co., Ltd. (Oct. 1985, pp. 379–383, 388–391, 1232.

Primary Examiner—Kevin A. Kriess
Assistant Examiner—John I. Chavis
Attorney, Agent, or Firm—Stroock & Stroock & Lavan

[57] ABSTRACT

An apparatus and method for controlling the bus cycle running time of a data processing apparatus. The apparatus includes a CPU and at least one device such as a memory device, input/output device and the like which receives data from the C. A clock signal supplied to the CPU is varied based on the bus cycle or address within the device which is identified by the CPU for processing of the data. Alternatively, the frequency of the clock signal is varied based on ambient temperature and line voltage conditions. Accordingly, processing speed of the CPU can be varied to accommodate high speed memory devices and slower speed input/output devices.

24 Claims, 21 Drawing Sheets

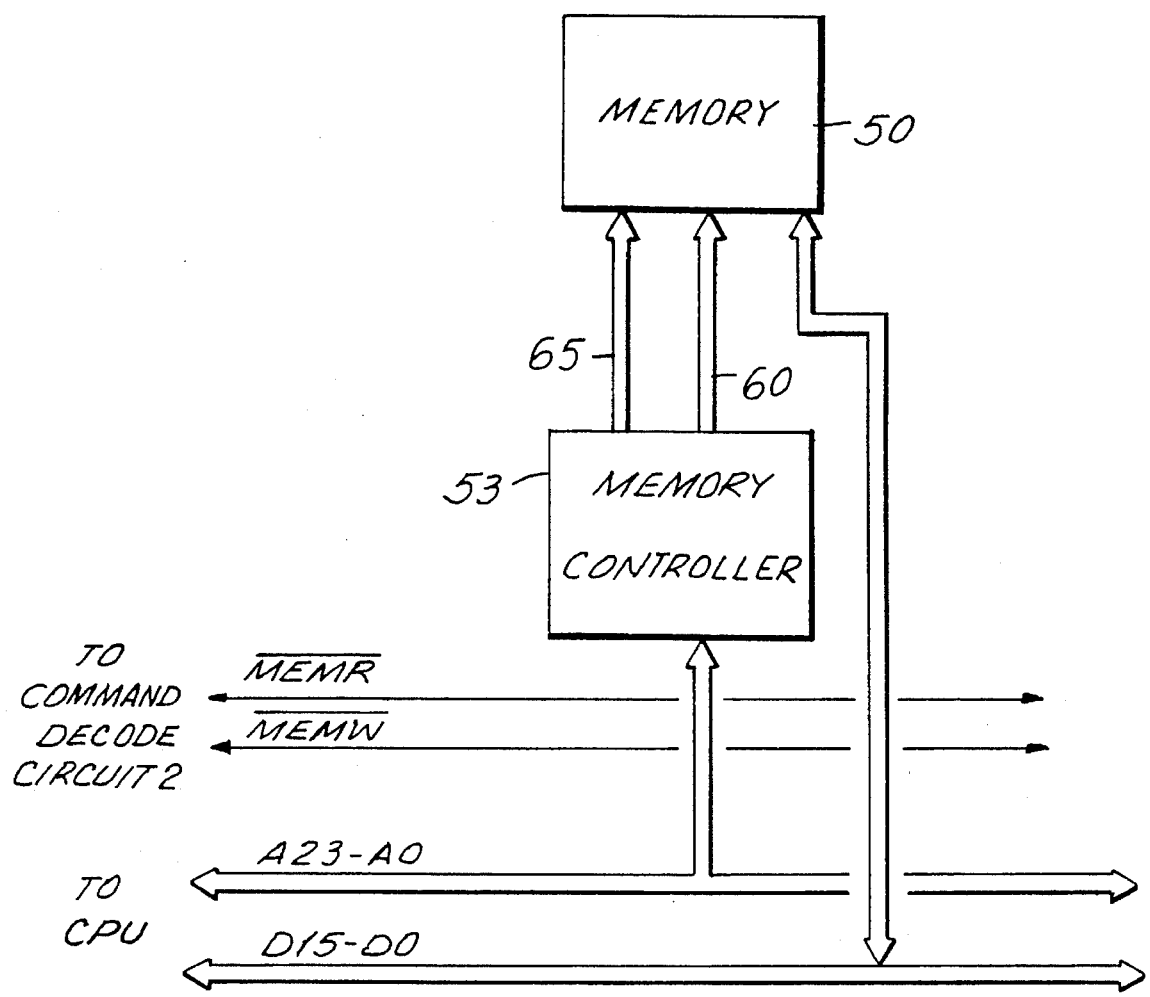

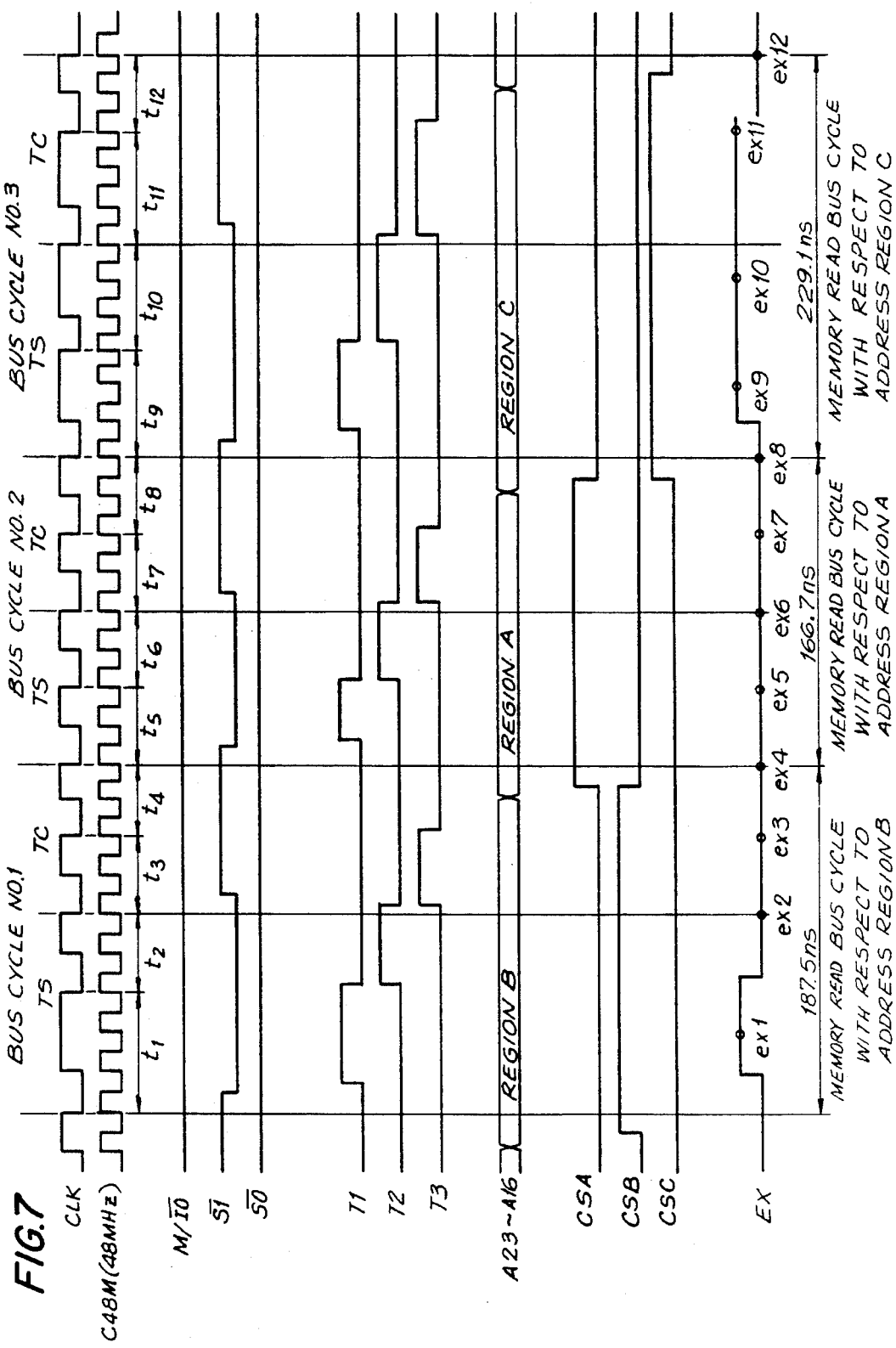

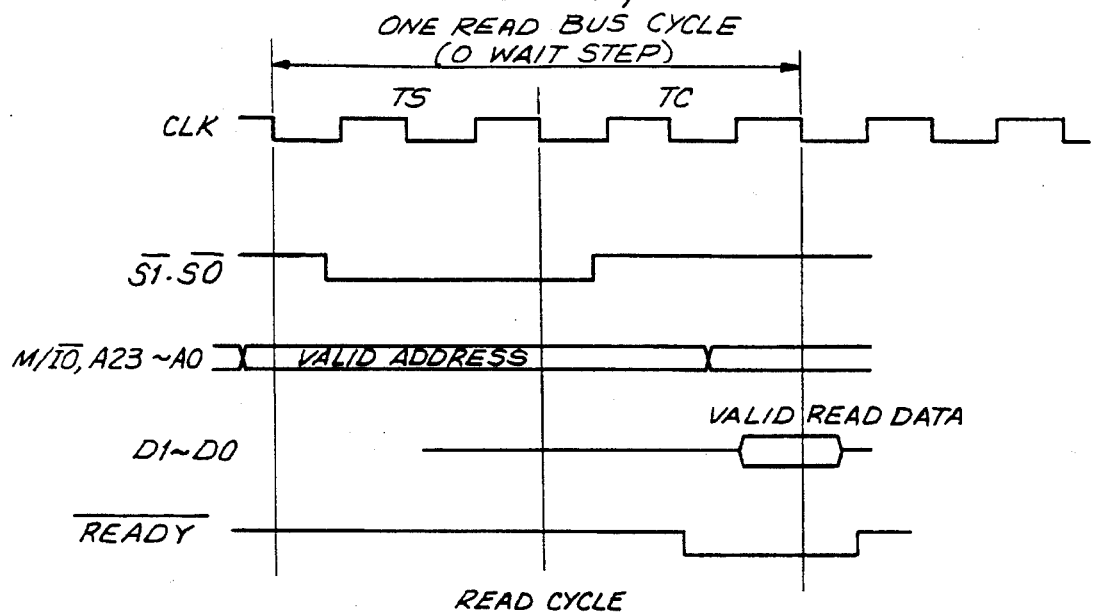
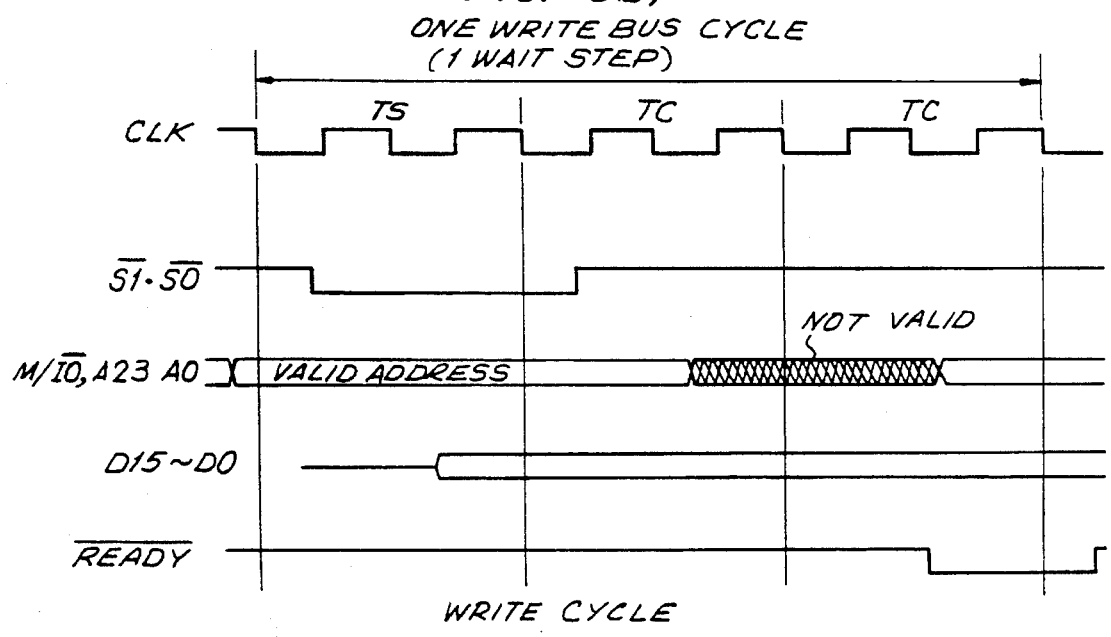

FIG. 9

| ADDRESS REGION | MEMORY ADDRESS | MEMORY ELEMENT FOR USE | | THE NUMBER OF INSERTED WAIT AND BUS CYCLE TIME | | | |
|---|---|---|---|---|---|---|---|
| | | | | EXAMPLE OF THE INVENTION | | PRIOR ART | |
| | | KIND | CYCLE TIME | WAIT | BUS CYCLE | WAIT | BUS CYCLE |
| A | 0F0000~0FFFFF FF0000~FFFFFF | EPROM | 150 ns | 0 | 166.7 ns | 0 | 166.7 ns |
| B | 000000~09FFFF | DRAM | 180 ns (tRAC=100 ns) | 0.25 | 187.5 ns | 1 | 250 ns |
| C | OTHERS | DRAM | 210 ns (tRAC=120 ns) | 0.75 | 229.1 ns | 1 | 250 ns |

MEMORY BUS CYCLE WITH RESPECT TO ADDRESS REGION B

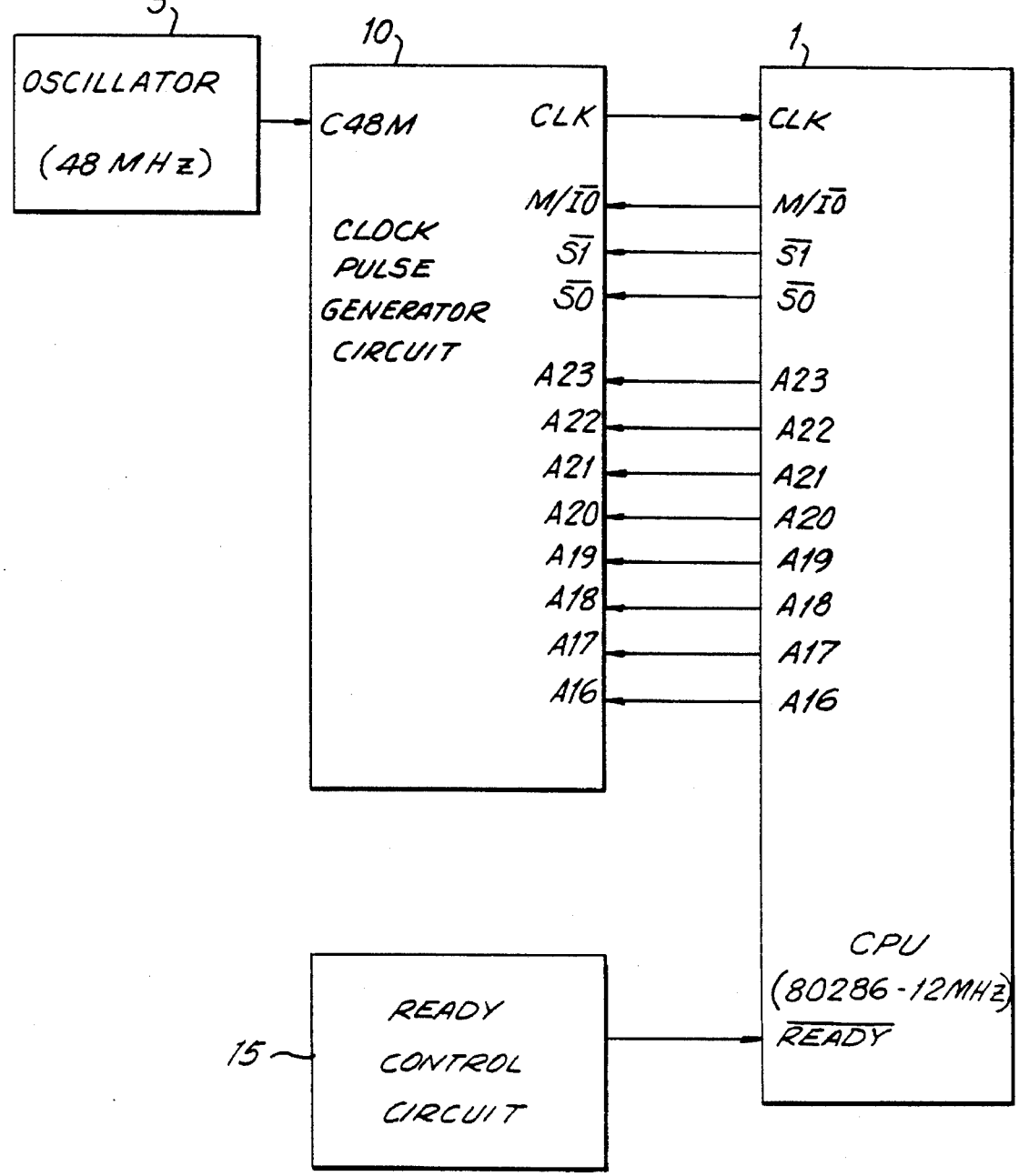

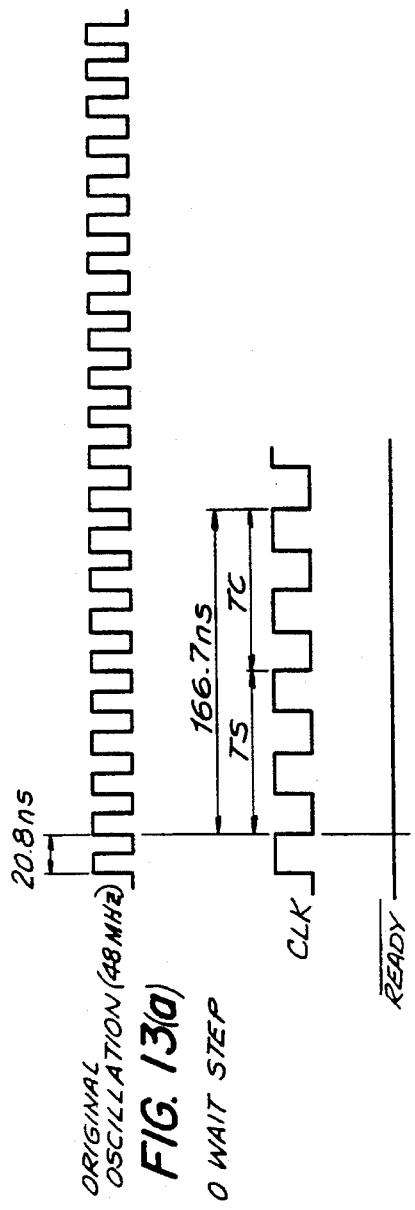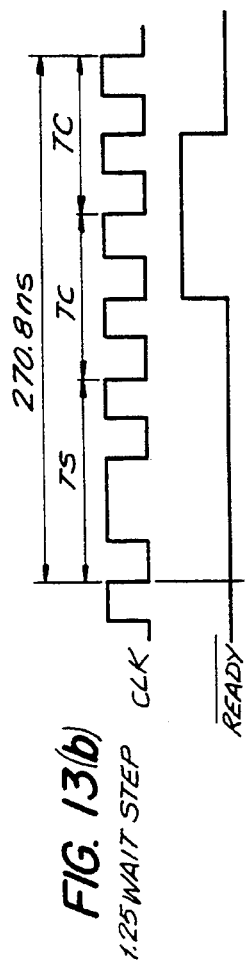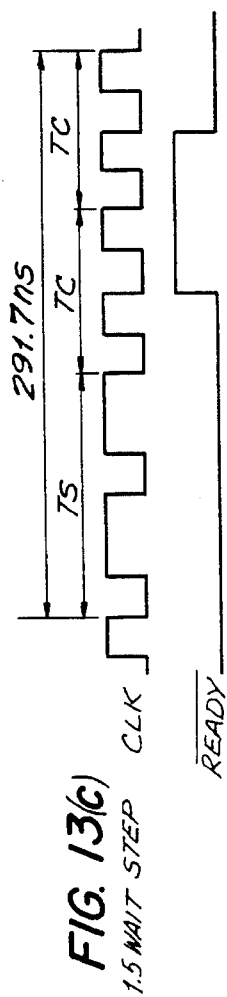

FIG. 16

| M/$\overline{IO}$ | $\overline{S1}$ | $\overline{S0}$ | BUS CYCLE | CORRESPONDING SIGNALS |
|---|---|---|---|---|
| 0 | 0 | 0 | INTERRUPTION ACKNOWLEDGE | |
| 0 | 0 | 1 | I/O READ | $\overline{IOR}$ |
| 0 | 1 | 0 | I/O WRITE | $\overline{IOW}$ |
| 0 | 1 | 1 | NOTHING | |
| 1 | 0 | 0 | HOLD OR SHUT DOWN | |
| 1 | 0 | 1 | MEMORY READ | $\overline{MEMR}$ |
| 1 | 1 | 0 | MEMORY WRITE | $\overline{MEMW}$ |
| 1 | 1 | 1 | NOTHING | |

APPARATUS AND METHOD FOR CONTROLLING THE RUNNING OF A DATA PROCESSING APPARATUS

This is a continuation of application Ser. No. 07/355,730, filed May 23, 1989, now abandoned.

BACKGROUND OF THE INVENTION

This invention is directed towards an apparatus and method for controlling the running of a data processing unit, and more particularly to the bus cycle running time of a central processing unit such as a personal computer.

Significant advancements have been made to increase the operating speed of central processing units (CPU), dynamic access memories (DRAM) and erasable programmable read only memories (EPROM). The improved operating speeds of the CPU, DRAM and EPROM permit new products to be introduced into the marketplace each year having faster processing speeds. Improved processing speeds can be realized by increasing the clock pulse frequency of the CPU and by using high speed memories (e.g. DRAM or EPROM).

The operating speeds of existing input/output units (I/O) relative to CPUs and memory devices, however, have remained constant such that the operating speeds of CPUs and memory devices is now incompatible with the operating speeds of existing I/O devices. Conventional CPUs overcome this incompatibility by employing a wait step which slows down the bus cycle running time of the CPU. More particularly, a ready terminal of the CPU is held at a low logic level to create the wait step in the bus cycle running time of the CPU. Coordination between the high speed CPU and low speed I/O is achieved.

A conventional data processing unit 100 employing this wait step technique is illustrated in FIG. 15. For illustrative purposes only, data processing unit 100 has been simplified to include only those portions necessary to distinguish the same from the invention. Data processing apparatus 100 includes a CPU 21 such as an 80286, 8 MHz version manufactured by the Intel Company. CPU 21 includes a clock (CLK) input for receiving pulses of a clock (CLK) signal. The frequency of these pulses is about twice the operating speed of CPU 21. Three output terminals M/$\overline{IO}$, $\overline{S1}$ and $\overline{S0}$ of CPU 21 produce output signals M/$\overline{IO}$, $\overline{S1}$ and $\overline{S0}$, respectively.

Processing of data by CPU 21 requires a number of different bus cycles. These different bus cycles and the corresponding logic are represented by output signals M/$\overline{IO}$, $\overline{S1}$ and $\overline{S0}$ as shown in FIG. 16. The different bus cycles during the running of CPU 21 can be extended when a $\overline{READY}$ terminal of CPU 21 is at a high logic level. When the signal provided to the $\overline{READY}$ terminal once again assumes a low logic level, as shown in FIG. 15, extension of the bus cycle ends. CPU 21 also includes address buses A23-A0 and a plurality of data buses D15-D0. A command decode circuit 2 in response to signals M/$\overline{IO}$, $\overline{S1}$ and $\overline{S0}$ produces a plurality of command signals $\overline{IOR}$, $\overline{IOW}$, $\overline{MEMR}$ and $\overline{MEMW}$ which correspond to different bus cycle conditions of FIG. 16. An oscillator 23 produces the pulses of signal CLK at a frequency of 16 MHz which is supplied to a CLK input of CPU 21 and a clock input of command decode circuit 2.

Output signals $\overline{MEMR}$ and $\overline{MEMW}$ of command decode circuit 2 for reading and writing from a memory 50, respectively, are supplied in combination with corresponding address signals traveling along address buses A23-A0 from CPU 1 to a memory controller 53. Data is written into or read from memory device 50 by CPU 1 based on memory address signals traveling along a plurality of buses 60 and memory control signals traveling along a plurality of buses 65 supplied from memory controller 53.

FIG. 17 illustrates the timing relationship between the signals produced by oscillator 13, CPU 21 and command decode circuit 2. CPU 21 includes a memory read bus cycle T31, an I/O read bus cycle T32, a memory write bus cycle T33 and a I/O write bus cycle T34. Each bus cycle includes two clock cycles TS and TC. Clock cycles TS and TC each include two pulses of the CLK signal. Each pulse of the CLK signal has a width of 62.5 ns. Accordingly, clock cycles TS and TC each have a cycle time of 125 ns and each bus cycle T31, T32, T33, T34 has a bus cycle time of 250 ns.

During clock cycle TS of each bus cycle, output signals M/$\overline{IO}$, $\overline{S1}$ and $\overline{S0}$ are produced by CPU 21 to identify each of the bus cycles. Command decode circuit 2 decodes signals M/$\overline{IO}$, $\overline{S1}$ and $\overline{S0}$. Thereafter, during clock cycle TC of bus cycles. T31, T32, T33 and T34 command signals $\overline{MEMR}$, $\overline{IOR}$, $\overline{MEMW}$ and $\overline{IOW}$ are produced by command decode circuit 2, respectively. The pulse length of each of these command signals is about 125 ns.

Output signals $\overline{MEMR}$ and $\overline{MEMW}$ of command d code circuit 2 for reading and writing from a memory 50, respectively, are supplied in combination with corresponding address signals traveling along address buses A23-A0 from CPU 1 to a memory controller 53. Data is written into or read from memory device 50 by CPU 1 based on memory address signals traveling along a plurality of buses 60 and memory control signals traveling along a plurality of buses 65 supplied from memory controller 53.

As shown in FIG. 18, a modified conventional data processing apparatus 120 permits the speed at which data is processed to be increased compared to unit 100. Unit 120 includes a CPU 1 (809286, 12 MHz version), a command decode circuit 12 and an oscillator 13 which operate in substantially the same manner as CPU 21, command decode circuit 2 and oscillator 23 of unit 100, respectively. Oscillator 13 produces a CLK signal having a 24 MHz frequency. Data processing apparatus 120 is otherwise substantially the same as unit 100 except that a READY control circuit 16 provides a READY signal to CPU 1 and command decode circuit 12 so that certain bus cycle times are extended.

As shown in FIG. 19, each clock cycle TS and TC has two clock pulses each of which has a time interval of about 41.7 ns. Accordingly, clock cycles TS and TC each have a time interval of about 82.3 ns. The time intervals of bus cycles T21, T22, T23 and T24 of unit 120 are each 167 ns. The time intervals of bus cycles T31, T32, T33 and T34, however, are each 250 ns. The reduction in bus cycle times, which is approximately 33%, is due to the increase in the frequency of CLK signal from 16 MHz to 24 MHz. Generally, read bus cycle T31 and memory write bus cycle T33 are compatible with high speed memory devices. Conventional I/O devices, however, cannot operate at a bus cycle time of 167 ns but rather require a bus cycle time of approximately 250 ns.

READY control circuit 16 provides a wait step to extend I/O read bus cycle T22 and I/O write bus cycle T24 to about 250 ns. The wait step is not employed during memory read bus cycle T21 and memory write bus cycle T23. Command signals $\overline{IOR}$ and $\overline{IOW}$ each include one wait step of approximately 83.3 ns. Since memory read bus cycle T21 and memory write bus cycle T23 do not require a wait step, each of these bus cycles has only one TC clock cycle. The time interval of cycles T21 and T23 are each about 167 ns. I/O read bus cycle T22 and I/O write bus cycle T24 each have one TS clock cycle and two TC clock cycles spanning a time interval of 250 ns. Command signals $\overline{IOR}$ and $\overline{IOW}$ are produced during the corresponding TC clock cycles of bus cycle T22 and T24, respectively. The additional TC clock cycle during bus cycles T22 and T24 is due to the READY signal being at a high logic level at the end of the first TC clock cycle of bus cycle T22 and T24.

Data processing apparatus 120 controls its running speed by controlling the READY signals applied to CPU 1. Desired bus cycles are extended based on the logic level of the READY signal. When the READY signal is at a high logic level, a wait step is added to the running time of the bus cycle. Accordingly, the bus cycle of CPU 1 can be made compatible with the slower operating speed of the I/O device.

The foregoing method for controlling the running speed of apparatus 120 to accommodate the slower operating speed of an I/O device has several drawbacks. More particularly, data processing units such as personal computers have become standardized. Use of a connector (i.e. option slot) to add an extended board having additional functions is commonly employed to upgrade the personal computer. Various kinds of extended boards are available from a variety of sources including special extended board manufacturers and personal computer manufacturers. The use of extended boards for personal computers is steadily increasing in importance. New products offered by personal computer manufacturers must be compatible with existing extended boards (i.e. used with older generations of personal computers).

For exemplary purposes only, assume data processing apparatus 120 represents a new product to be used with I/O devices designed for use with data processing unit 100. The $\overline{IOR}$ and $\overline{IOW}$ command signals required by the I/O devices are produced during the TC clock cycles of bus cycles T32 and T34 of FIG. 17, respectively. CPU 1, however, produces command signals IOR and IOW during clock cycles TC of bus cycles T22 and T24 of FIG. 19. Bus cycles T22 and T24 include a wait step whereas clock cycles T32 and T34 have no wait step. The pulse lengths of command signals IOW and IOR are each 125 ns for bus cycles T32 and T34, respectively. The pulse lengths of command signals IOW and IOR are each 167 ns for bus cycles T22 and T24, respectively. The I/O write data command signals between the I/O devices and CPU 1 also differ in setting up and holding times. The differences in pulse length, setting up and holding times prevent some extended boards for new products from being used with I/O devices.

The addition of a wait step to accommodate the slower operational speed of an I/O device also creates a far less efficient use of CPU 1. More particularly, since the CLK signal produced by oscillator 13 of unit 120 has a frequency of 24 MHz, bus cycle times increase in steps of 83.3 ns for each wait step (i.e. 166.7 ns for a 0-wait step, 250 ns for a 1-wait step, 333.3 ns for a 2-wait step, etc.). CPU 1 is operable for providing access to a DRAM having a cycle time of 180 ns commonly referred to as a DRAM for speed of 100 ns (i.e. the row access strobe (RAS) access time). RAS is an input terminal of a DRAM. Such access by CPU 1 can be supplied on a stable basis. The bus cycle of CPU 1 without a wait step is 166.7 ns which is less than the cycle time of 180 ns required by the DRAM. Access to the DRAM cannot be provided without a wait step. Conventional data processing apparatuses such as apparatus 120 provide the wait step to ensure access to the DRAM. The bus cycle time with one wait step, however, is 250 ns which is far greater than the 180 ns time interval required for access to the DRAM. CPU 1 operates on an inefficient basis, that is, about 70 ns of the 250 ns bus cycle time are not used by CPU 1. In particular, optimum performance of CPU 1 is not realized due to the frequency of the CLK signal being preset.

Data processing apparatuses are also designed to operate within a temperature range of between about 0° C. through 40° C. The corresponding voltage range ($V_{cc}$) is about 4.75 volts through 5.25 volts. At a temperature of 40° C. and line voltage of 4.75 volts, the CPU can operate at a clock frequency of 9 MHz. At a temperature of 25° C. and line voltage of 5.0 volts, the CPU can operate at a clock frequency of 10 MHz. At a temperature of 0° C. and line voltage of 5.25 volts, the CPU can operate at a clock frequency of 11 MHz. Data processing apparatus 120, however, is preset at 9 MHz and operates at about 25° C. at a line voltage of 5.0 volts even though oscillator 120 is designed to operate at a clock frequency of 10 MHz. Consequently, the operating speed of data processing unit 120 is less than optimum. When the CLK signal is 10 MHz, data processing unit 120 normally cannot operate at a temperature of 40° C. and line voltage of 4.75 volts.

Accordingly, it is desirable to provide a data processing apparatus in which the running speed of the CPU can be adjusted based on the type of bus cycle to more efficiently utilize the CPU. The frequency of the clock signal should dynamically reduce the bus cycle time to increase the processing speed of the CPU when using high speed memory devices and to increase the bus cycle time to decrease the processing speed of the CPU when communicating with I/O devices. Variation of the clock signal frequency should also be provided based on the ambient temperature conditions and line voltage to optimize the efficiency of the data processing unit.

SUMMARY OF THE INVENTION

Generally speaking, in accordance with the invention, a method for controlling the running time of different bus cycles of a CPU include processing data during the different bus cycles based on the frequency of a clock signal supplied to the CPU and varying the frequency of the clock signal based on the bus cycle which the CPU is presently operating under. The running time for processing data by the CPU is adjusted in accordance with each bus cycle.

The bus cycles include a read memory bus cycle and a write memory bus cycle. A first clock signal is produced having a first frequency based on the read memory bus cycle. A second clock signal is produced having a second frequency based on the write memory bus cycle. Accordingly, the length of time for the CPU to read data from and write data into a memory device are different.

In another aspect of the invention, a method for controlling the running speed of different bus cycles of a CPU within an data processing apparatus include processing data during one of the bus cycles based on the address within a device of the data processing apparatus. The address is identified by the central processing unit for processing of data. The method also includes varying the frequency of the clock signal supplied to the CPU based on the address. Consequently, the running speed for processing data by the central processing unit is adjusted based on the address within the device.

In yet another aspect of the invention, a method for controlling the running time of different bus cycles of a data processing apparatus include providing a clock signal to the CPU wherein the clock signal includes at least two clock cycles, each clock cycle having at least two clock periods. The method also includes extending at least one of the clock periods of at least one of the clock cycles based on the bus cycle which the CPU is presently operating under. Accordingly, the running time for processing data by the CPU is adjusted in accordance with each bus cycle. Each clock period to be extended can be set based on a computer program. By providing a READY signal at a high logic level to the CPU, the bus cycle time can be further increased.

Extending at least one of the clock periods of at least one of the clock cycles also can be based on the address within the device of the data processing apparatus, the address being identified by the CPU for processing of data.

In an alternative embodiment of the invention the frequency of the clock signal is varied based on the ambient temperature and line voltage supplied to the CPU.

Accordingly, it is an object of the invention to provide an improved apparatus method for controlling the running of a data processing apparatus by adjusting the bus cycle running time of the CPU.

It is another object of the invention to provide an improved apparatus and method for controlling the running of a data processing apparatus wherein the bus cycle running time of the CPU is reduced and increased by increasing and reducing the frequency of the clock signal supplied to the CPU, respectively.

It is a further object of the invention to provide an improved apparatus and method for controlling the running of a data processing apparatus whereby the CPU is more efficiently utilized as compared to conventional data processing units.

It is still another object of the invention to provide an improved apparatus and method for controlling the running of a data processing apparatus wherein the clock signal supplied to the CPU is varied based on ambient temperature and line voltage.

Still other objects and advantages of the invention will in part be obvious and will in part be apparent from the specification.

The invention accordingly comprises several steps in a relation of one or more such steps with respect to each of the others and the apparatus embodying features of construction, a combination of elements and arrangements of parts which are adapted to effect such steps, all is exemplified in the following detailed disclosure and the scope of the invention will be indicated in the claims.

BRIEF OF DESCRIPTION OF THE DRAWINGS

For a fuller understanding of the invention, reference is had to the following description taken in connection with the accompanying drawings in which:

FIGS. 1(a) and 1(b) are schematic and block diagrams of a data processing apparatus in accordance with one embodiment of the invention;

FIG. 2 is a timing chart of signals produced by the data processing apparatus of FIG. 1(a);

FIGS. 3(a) and 3(b) are schematic and block diagrams of a data processing apparatus in accordance with an alternative embodiment of the invention;

FIG. 7 is a timing chart of various signals produced by the data processing unit of FIG. 5;

Figure 5:
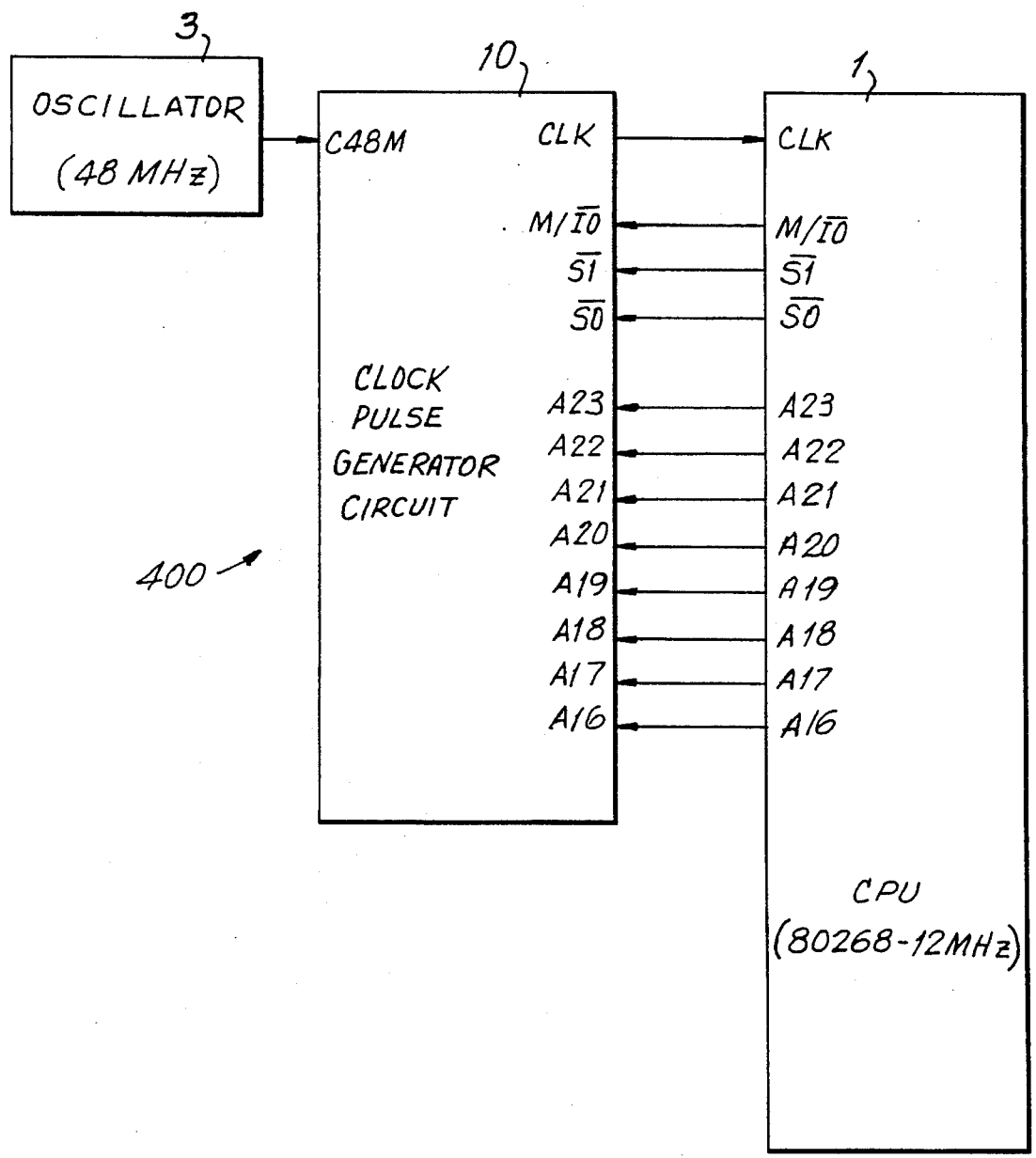
FIG. 5 is a block diagram of a data processing unit in accordance with another alternative embodiment of the invention.
Figure 10:
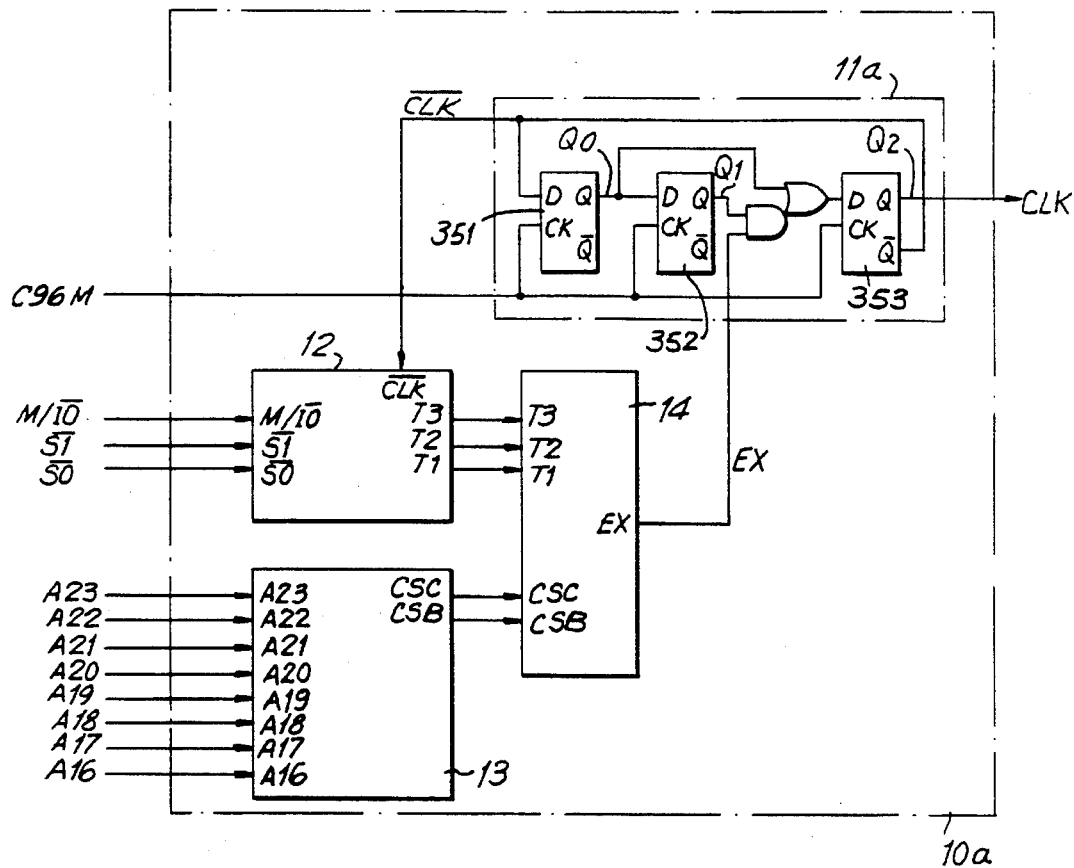
Figure 11:
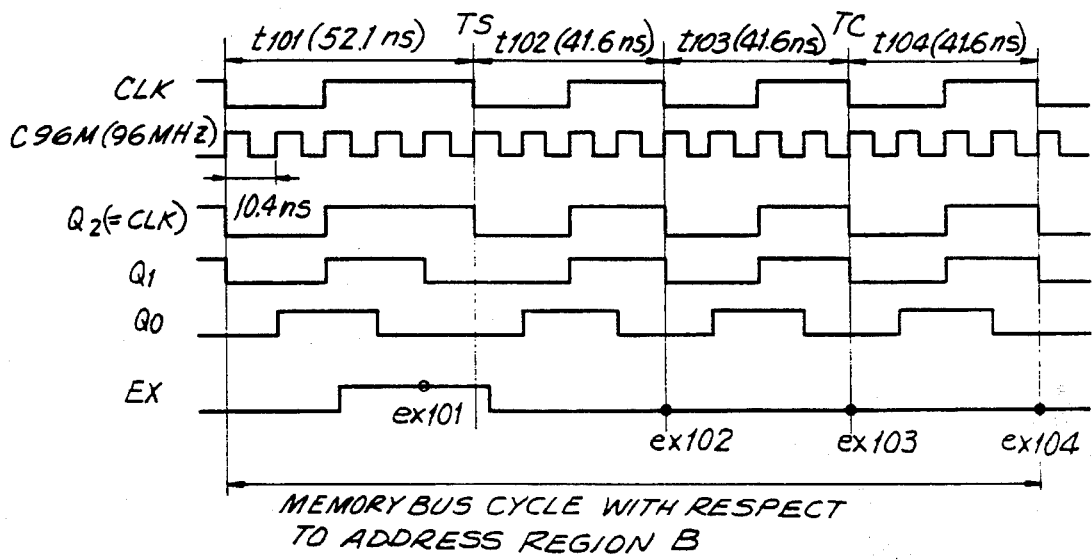
Figure 14A:
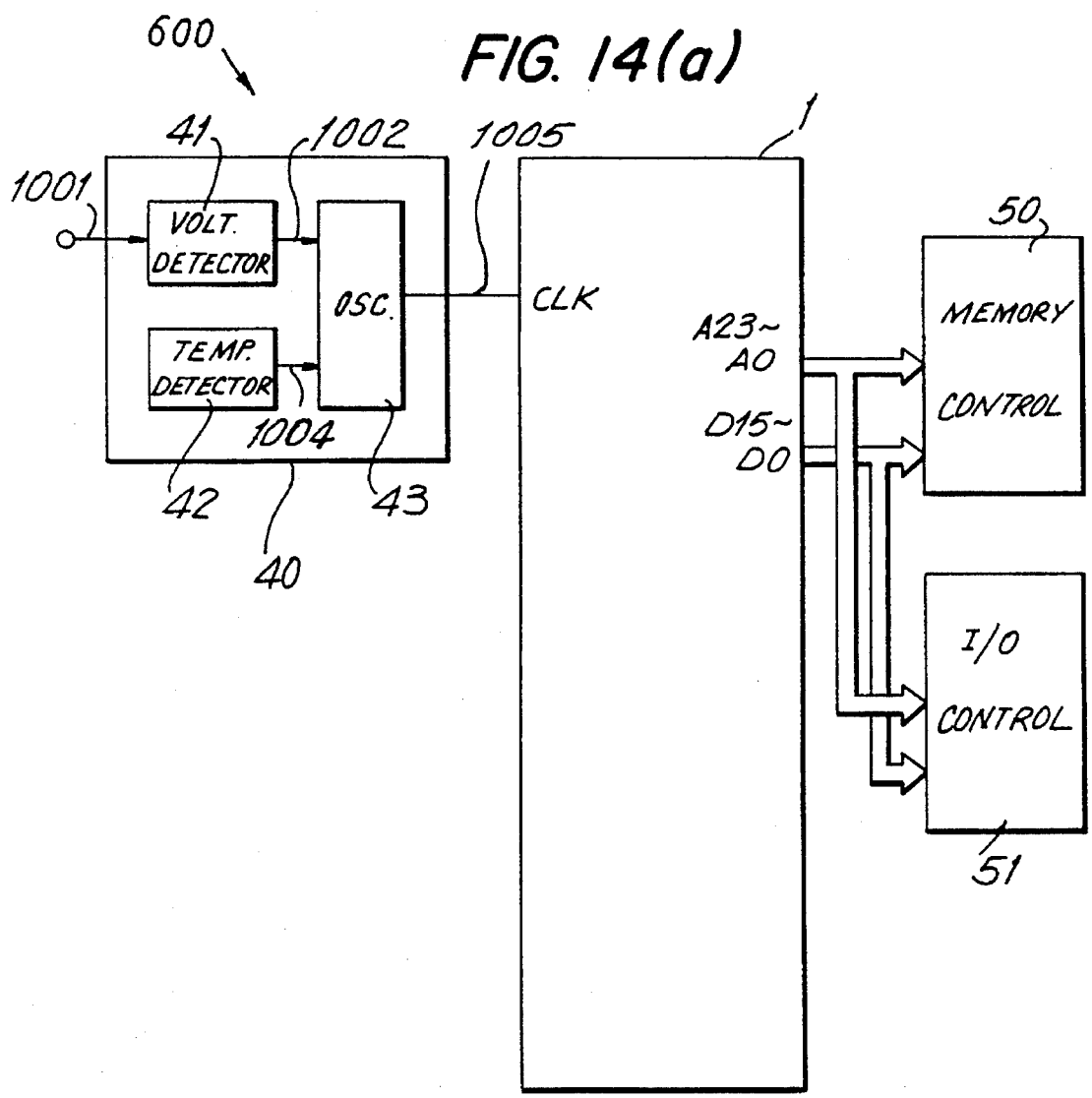
Figure 14B:
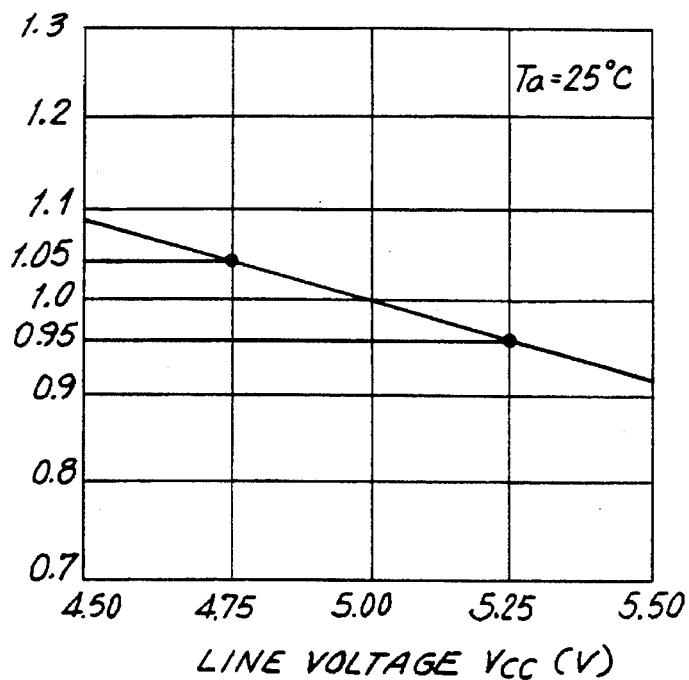
Figure 14C:
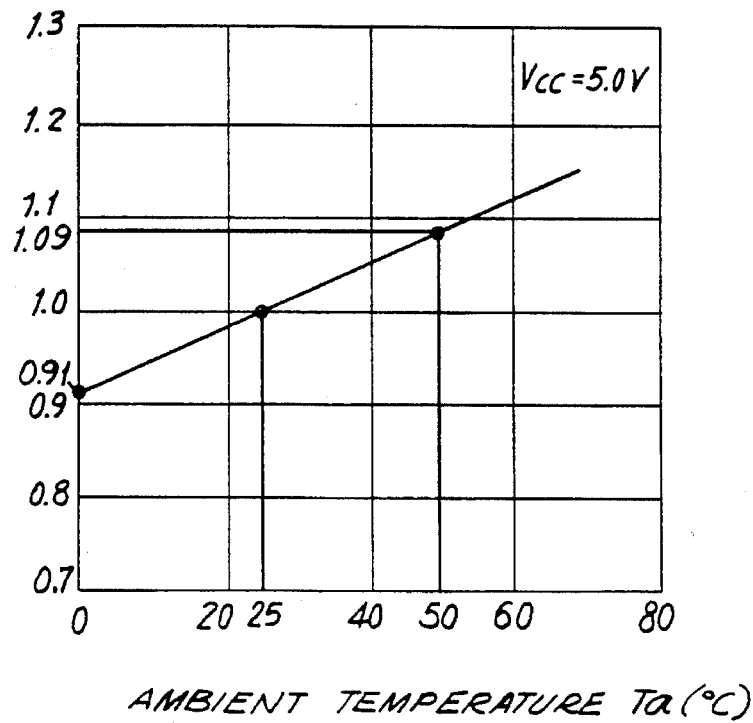
Figure 15:
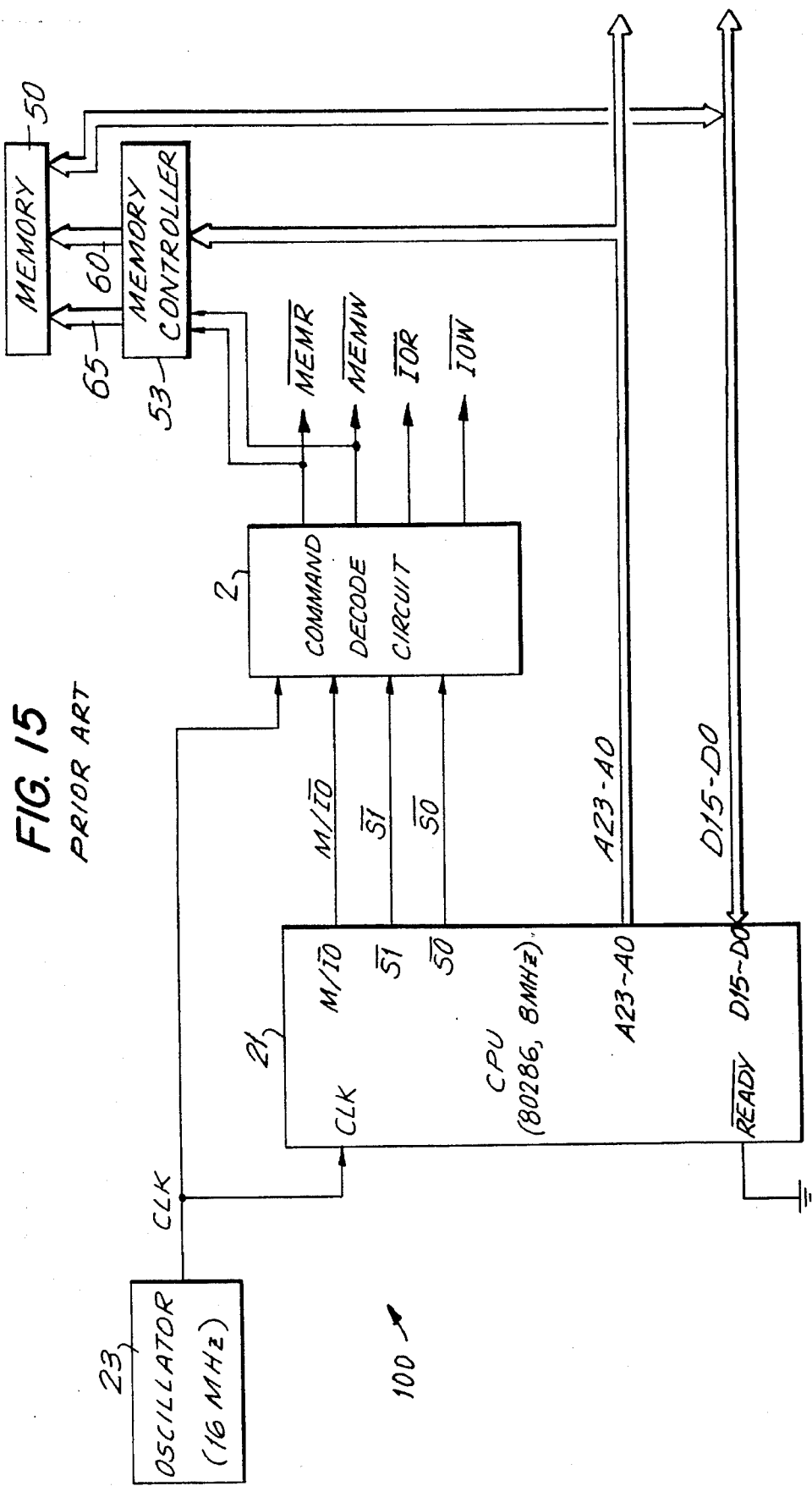
Figure 17:
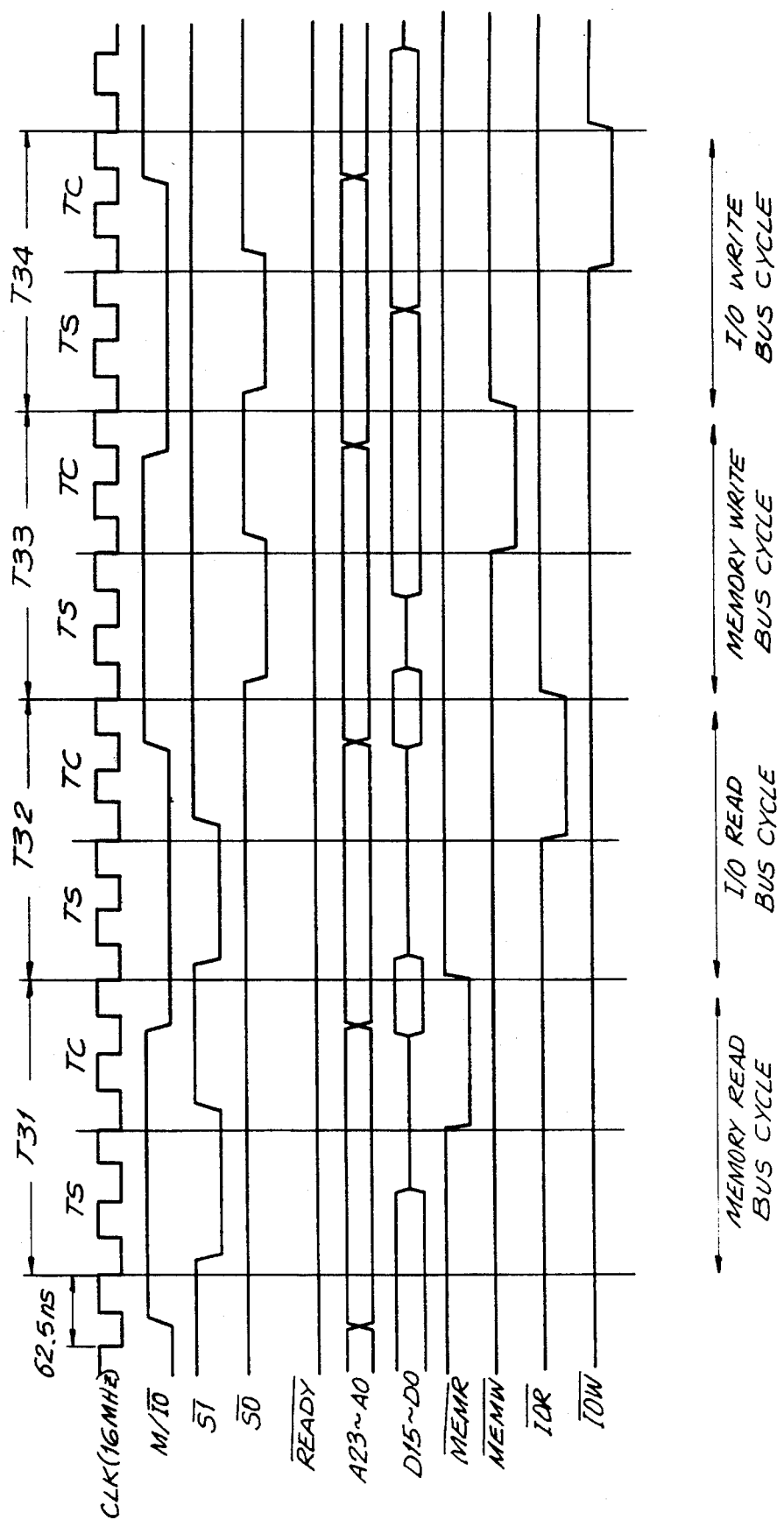
Figure 18:
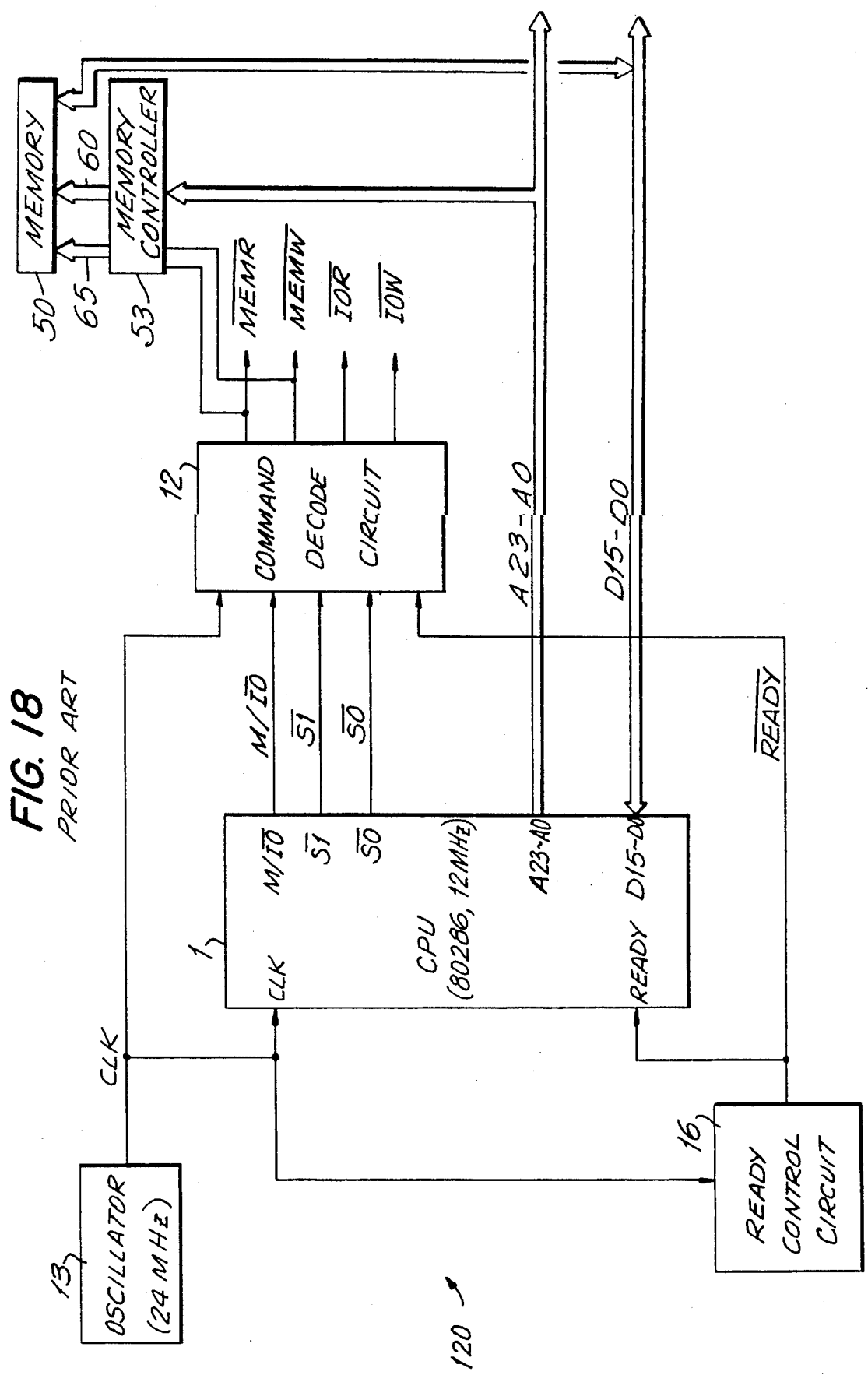
Figure 19:
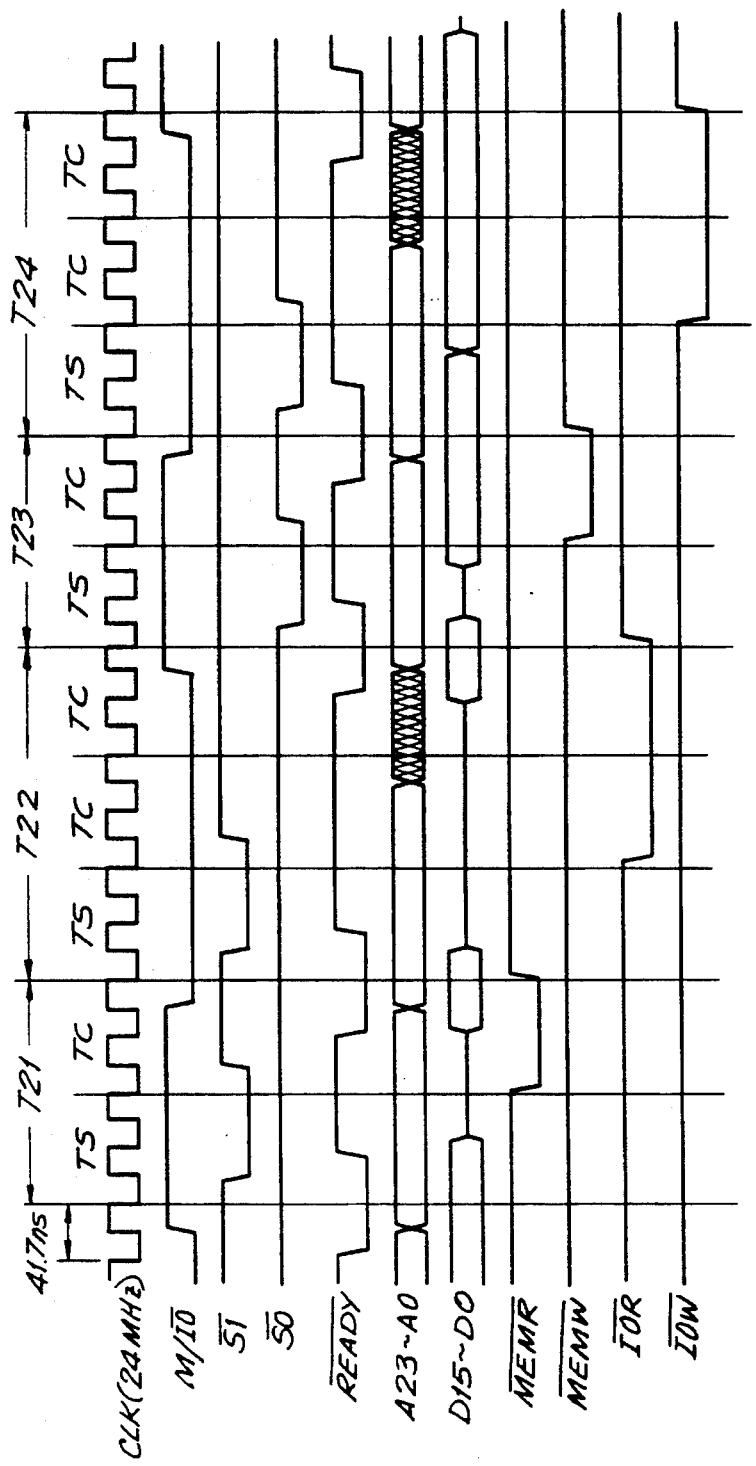

FIGS. 8(a) and 8(b) are timing charts of read and write bus cycles of the data processing apparatus of FIG. 5, respectively;

FIG. 9 is a table comparing bus cycles of a conventional data processing apparatus to the invention;

FIG. 10 is a schematic and block diagram of a clock pulse generator circuit in accordance with a further alternative embodiment of the invention;

FIG. 11 is a timing chart of a memory bus cycle of FIG. 10;

FIG. 12 is a block diagram of a data processing apparatus in accordance with still another alternative embodiment of the invention;

FIGS. 13(a), 13(b) and 13(c) are timing charts for three different wait steps;

FIG. 14(a) is a block diagram of a data processing apparatus in accordance with yet another alternative embodiment of the invention;

FIG. 14(b) and 14(c) graphically illustrate the access time-line voltage characteristics and access time-ambient temperature characteristics of the data processing unit of FIG. 14 (a), respectively;

FIG. 15 is a block diagram of a conventional data processing apparatus;

FIG. 16 is a table illustrating the types of bus cycles, command signals and associated logic produced by the data processing apparatus of FIG. 15;

FIG. 17 is a timing chart of various signals produced by the data processing apparatus of FIG. 15;

FIG. 18 is a block diagram of another conventional data processing apparatus; and FIG. 19 is a timing chart of various signals produced by the data processing apparatus of FIG. 18.

DETAILED DESCRIPTION OF THE PREFERRED EMBODIMENTS

In accordance with the invention, the running speed of a data processing apparatus is controlled by changing the frequency of the clock signal applied to a clock input terminal of a CPU based on the bus cycle presently being processed by the CPU. During bus cycles which operate at high speed such as reading from and writing into high speed memory devices, the frequency of the clock signal is increased. During the bus cycle for devices which operate at a slower operating speed such as, but not limited to, I/O devices the frequency of the clock signal is reduced. The running time of read and write bus cycles associated with the same memory also can be controlled by changing the frequency of the clock pulses.

The change in the frequency of the clock signal also can be dependent on the addresses accessed by the CPU. Bus cycle time is carefully adjusted by extending at least one clock cycle to include M pulses (M being an integer) wherein the bus cycle includes two clock cycles of N pulses (N being an integer) in length and wherein M≤N. During the bus cycle the CPU is in communication with a particular address of a specific device such as, but not limited to, a memory device or I/O device. The M clock pulses for extending a particular clock cycle can be set by programming of the CPU. By extending the clock cycle time one or more wait steps in processing data by the CPU can be precisely adjusted.

In accordance with another aspect of the invention, the method employed for controlling the running speed of a data processing apparatus varies bus cycle running time by changing the frequency of the clock pulses applied to a clock input terminal of a CPU in accordance with ambient temperature or line voltage conditions.

Figure 1A:
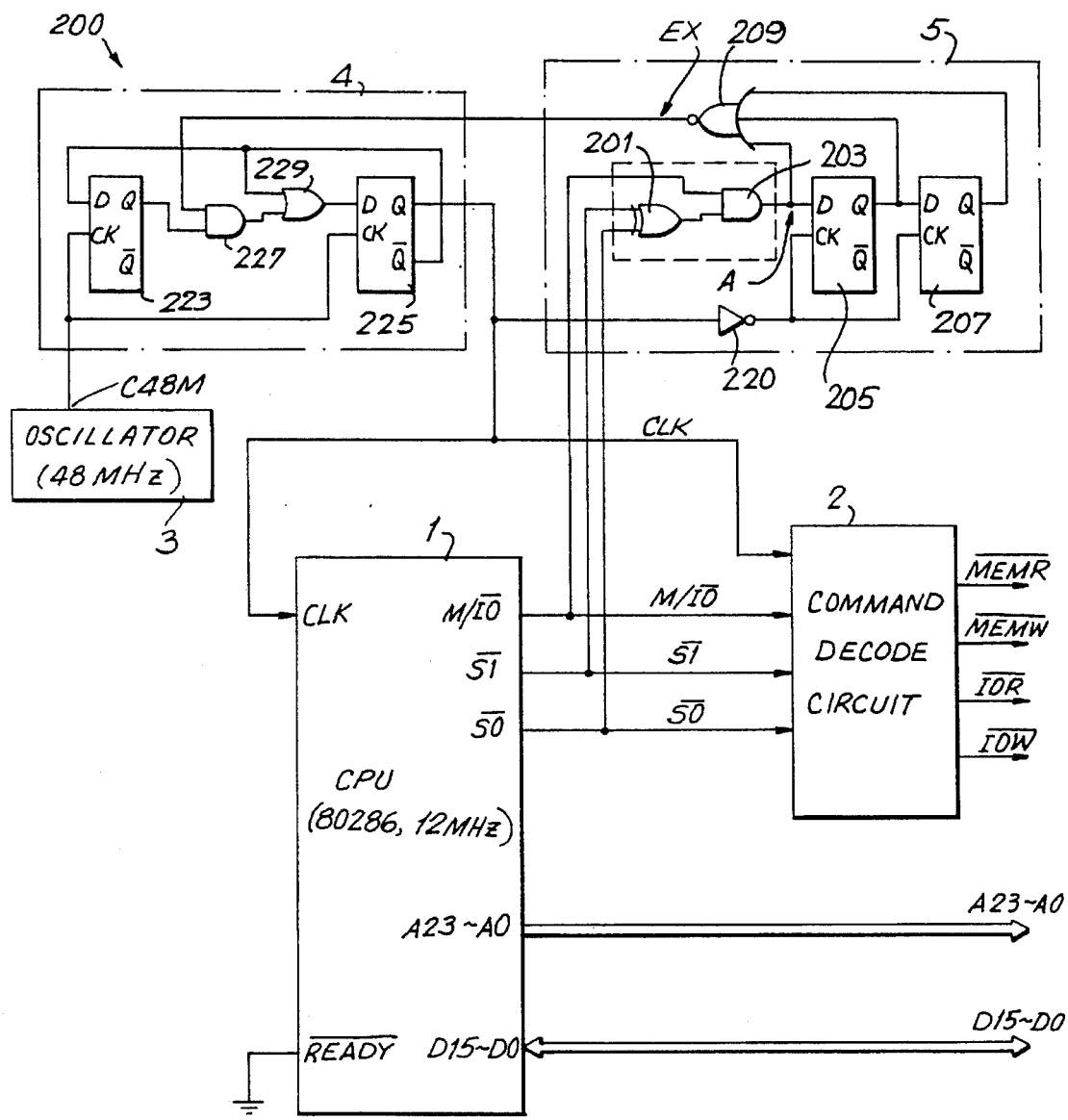
Figure 1B:
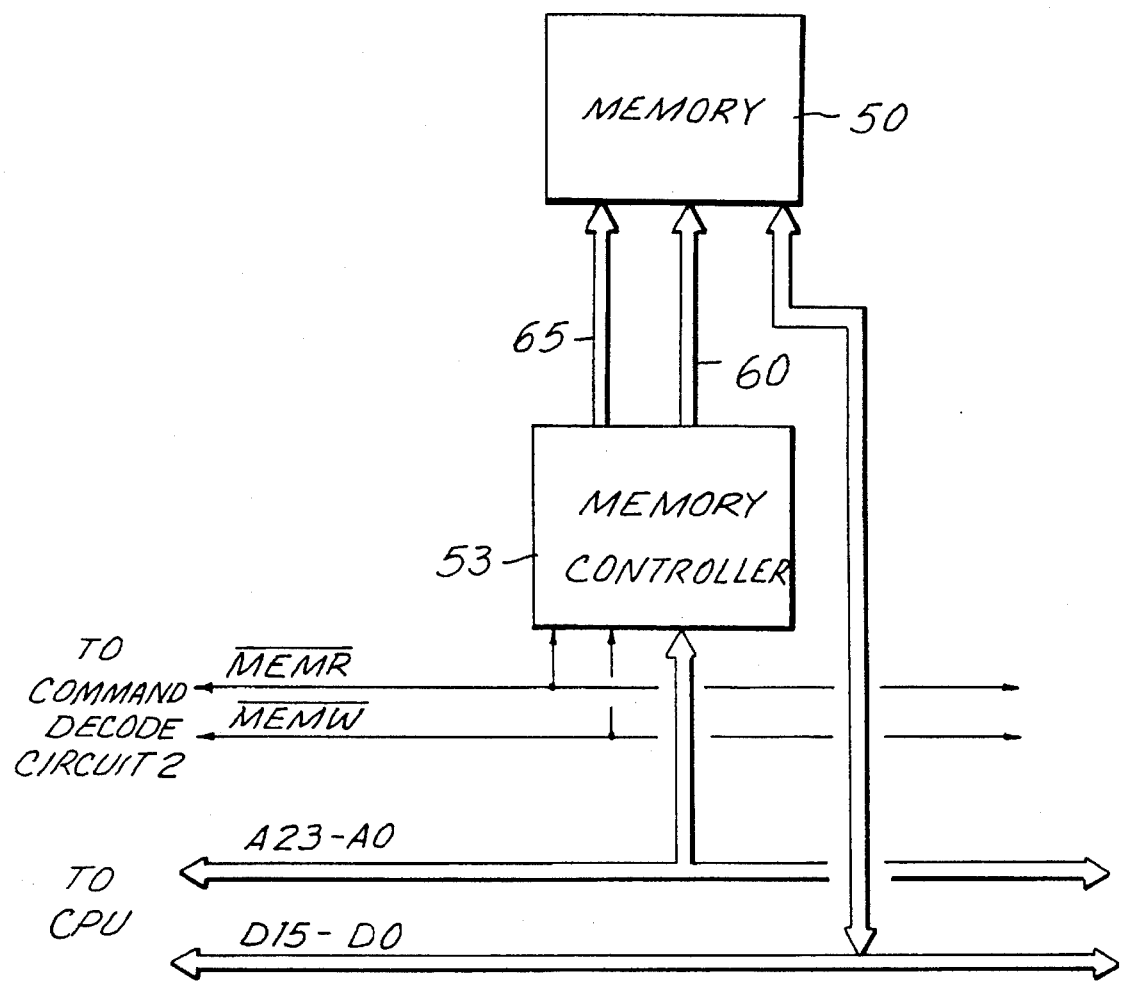

A data processing apparatus 200 in accordance with a first embodiment of the invention is shown in FIGS. 1(a) and 1(b). Apparatus 200 includes a CPU 1 (80286, 12 MHz version) in which a READY terminal is fixed at a low logic level. Apparatus 200 also includes a command decode circuit 2 and an oscillator 3 producing an oscillating signal having a frequency of 48 MHz. A frequency divider circuit 4 reduces the frequency of oscillating signal and produces a CLK signal supplied to the clock inputs of CPU 1 and command decode circuit 2. Circuit 4 is a ⅔ frequency divider, that is, when a control signal EX supplied by a bus identification circuit 5 is at a low logic level, circuit 2 divides the frequency of the oscillating signal produced by a factor of 2 to produce a CLK signal having a frequency of 24 MHz. When control signal EX is at a high logic level, circuit 4 divides the oscillating signal by a factor of 3 to produce a CLK signal having a frequency of 16 MHz.

The logic level of control signal EX reflects the type of bus cycle which is presently being processed by CPU 1. During memory bus and I/O bus cycles, control signal EX has a low logic level and a high logic level, respectively. Accordingly, frequency divider circuit 4 produces a CLK signal having a frequency of 24 MHz during a memory bus cycle and a CLK signal having a frequency of 16 MHz during an I/O bus cycle.

Signals M/$\overline{IO}$, $\overline{S1}$ and $\overline{S0}$ are supplied to bus cycle identification circuit 5 for decoding by an exclusive OR gate 201 and an AND gate 203. An A signal produced by AND gate 203 represents the bus cycle presently being processed by CPU 1. The M/$\overline{IO}$, $\overline{S1}$ and $\overline{S2}$ signals are produced by CPU 1 during the TS clock cycle. A pair of flip flops 205 and 207 of bus identification circuit 5 produce Q outputs which along with signal A are provided as inputs to an exclusive NOR gate 209 to produce control signal EX. Flip flops 205 and 207 are held stable during each bus cycle by the output of an invertor 220 which is connected to the clock inputs of flip flops 205 and 207.

Frequency divider circuit 4 includes two flip flops 223 and 225, and AND gate 227 and an OR gate 229. The oscillating signal produced by oscillator 3 is supplied to the clock inputs of flip flop 223 and flip flop 225. AND gate 227 receives as input signals the Q output of flip flop 223 and control signal EX. OR gate 229 receives as inputs the output of AND gate 227 and $\overline{Q}$ output of flip flop 225. The $\overline{Q}$ output of flip flop 225 is also connected to the D input of flip flop 223. The D input of flip flop 225 is connected to the output of OR gate 229. The Q output of flip flop 225 produces the CLK signal which is supplied to the clock inputs of CPU 1, command decode circuit 2 and the input of invertor 220.

A pair of output signals $\overline{MEMR}$ and $\overline{MEMW}$ of command decode circuit 2 for reading and writing from a memory device 50, respectively, are supplied in combination with corresponding address signals along address buses A23–A0 from CPU 1 to a memory controller 53. Data is written into or read from memory device 50 by CPU 1 based on memory address signals traveling along a plurality of buses 60 and memory control signals traveling along a plurality of buses 65 supplied from memory controller 53.

Figure 2:
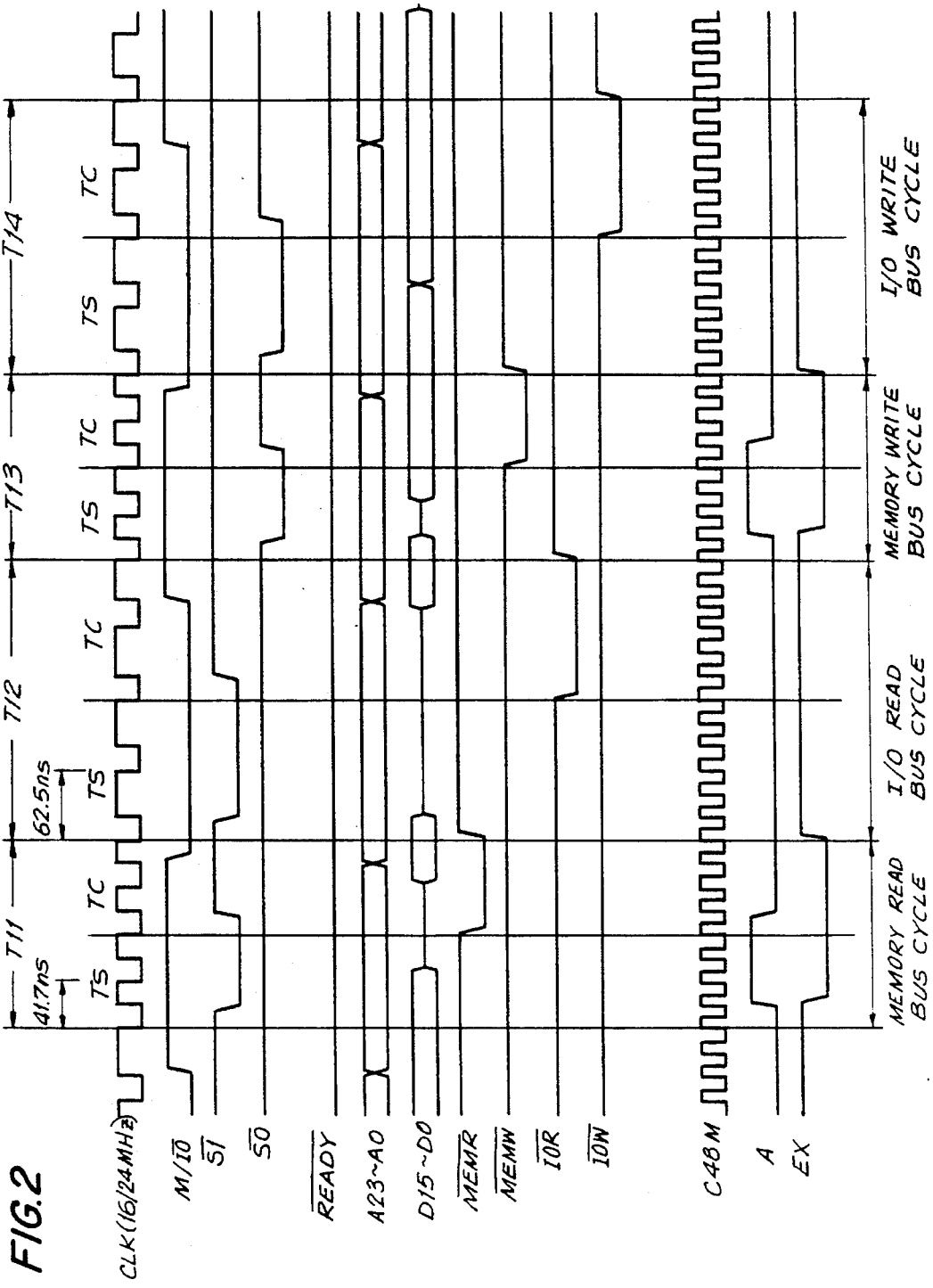

Operation of data processing apparatus 200 is illustrated by the timing chart of FIG. 2. During a memory bus cycle, the frequency of CLK signal is 24 MHz (12 MHz within CPU 1). During an I/O bus cycle, the frequency of CLK signal is 16 MHz (8 MHz within CPU 1). The frequency of CLK signal is dynamically changed.

During a memory read bus cycle T11 and a memory write bus cycle T13, CLK signal has a frequency of 24 MHz and a bus cycle time of approximately 167 ns. Cycles T11 and T13 are similar to cycles T21 and T23 of unit 120 when the READY signal is at a low logic level so that no wait step is included. During an I/O read bus cycle T12 and an I/O write bus cycle T14, the CLK signal has a frequency of 16 MHz. The processing speed of CPU 1 during cycles T14 and T16 is slower than during cycles T11 and T13. There is no need, however, to provide a READY signal having a high logic level to reduce the processing speed of CPU 1. No wait step needs to be added to reduce the operating speed of CPU 1.

Bus cycles T12 and T14 each have time intervals of 250 ns similar to the time intervals of bus cycles T22 and T24 of FIG. 19. The timing of bus cycles T12 and T14 of FIG. 2, however, is similar to bus cycles T32 and T34 of FIG. 17. More particularly, bus cycles T12 and T14 conform to the timing of bus cycles T32 and T34 used for a conventional standard data processing unit. The difference between bus cycles T12 and T14 of 250 ns and bus cycles T11 and T13 of 167 ns is provided by adjusting the frequency of the CLK signal supplied to CPU 1 during the I/O bus cycles of unit 200. Such adjustment permits apparatus 200 to conform to the frequency of the CLK signals of CPU 21 of apparatus 100 during the I/O bus cycle. Conventional data processing units such as apparatus 120 adjust only the I/O bus cycles T22 and T24 by including a wait step (i.e. an extra TC clock cycle) to conform to the I/O bus cycles T32 and T34 of apparatus 100. The extra wait step is provided by holding the READY terminal of the CPU at a high logic level. Unit 200, however, provides both high speed bus cycles T11 and T13 and slow speed bus cycles T12 and T14 without holding the READY terminal at a high logic level. As explained below, a more efficient utilization of the CPU is achieved.

It is to be understood that the CLK signal can have frequencies other than 24 MHz or 16 MHz and can be dynamically changed to include more than two different frequencies in accordance with the invention. Furthermore, additional conditions can be used to determine when the frequency of the CLK signal is to be set at 16 MHz and 24 MHz. For example, the frequency of CLK signal can be changed based on the memory and I/O address of the device to be used in processing data by CPU 1. If desired, a frequency of 24 MHz can be set to provide access to a memory in a particular address location and a frequency of 16 MHz can be used to provide access to a memory in another address location. The frequencies of the CLK signal can be set for each bus cycle by suitable programming (i.e. software).

Figure 3A:
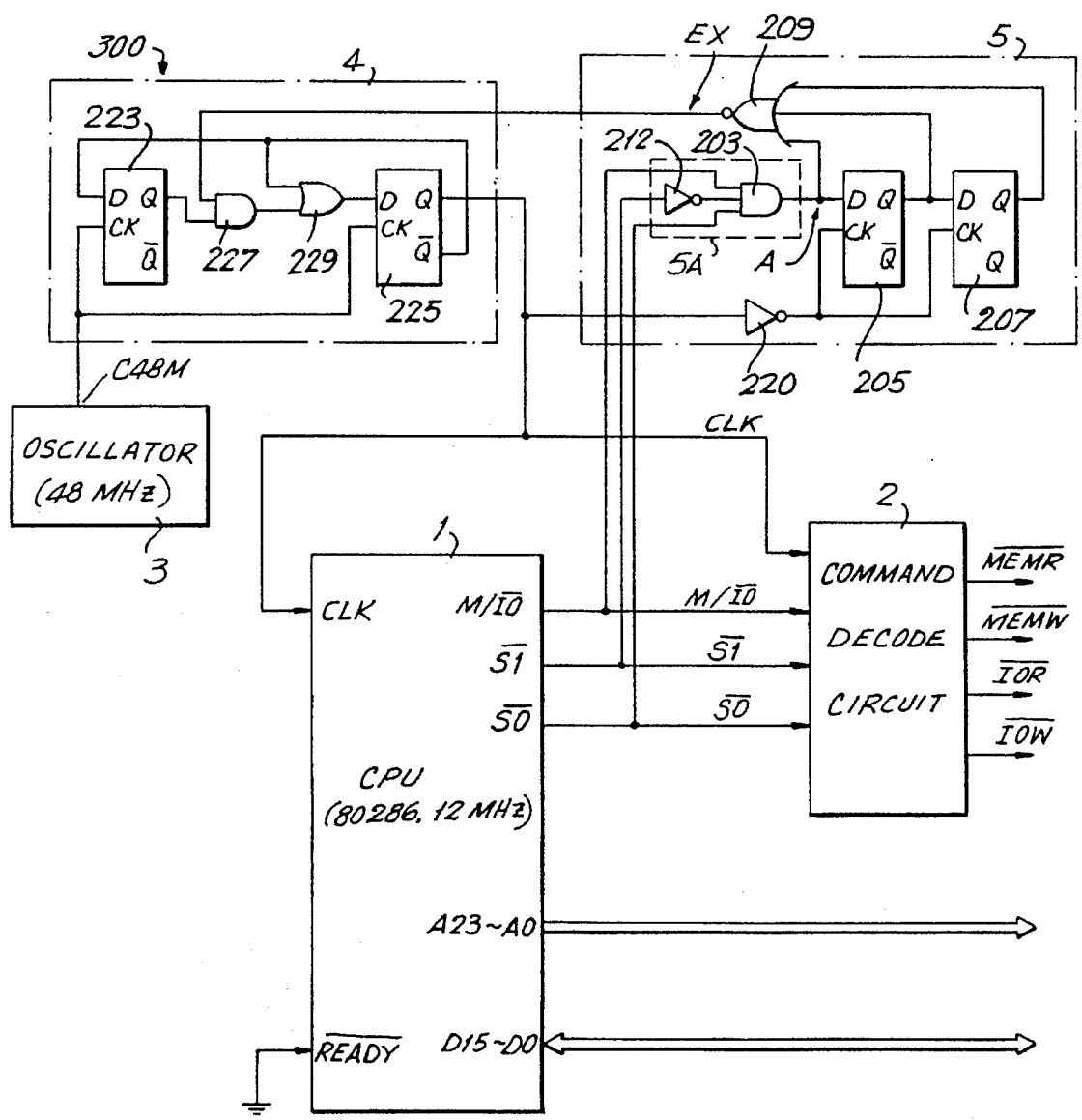

As shown in FIGS. 3(a) and 3(b), a data processing apparatus 300 in accordance with an alternative embodiment of the invention is substantially similar to the data processing unit 200 of FIGS. 1(a) and 1(b). Those elements which are constructed and operate in a similar manner are identified by like reference numerals. A bus cycle identification circuit 5A includes an inverter 212 rather than an exclusive NOR gate 201. Signal A assumes a high logic level only when signals M/$\overline{\text{IO}}$, $\overline{\text{S1}}$ and $\overline{\text{S2}}$ have high, low and high logic levels (1, 0, 1), respectively. In other words, signal A and consequently control signal EX are at high logic levels only during memory read bus cycle T11.

Figure 4:
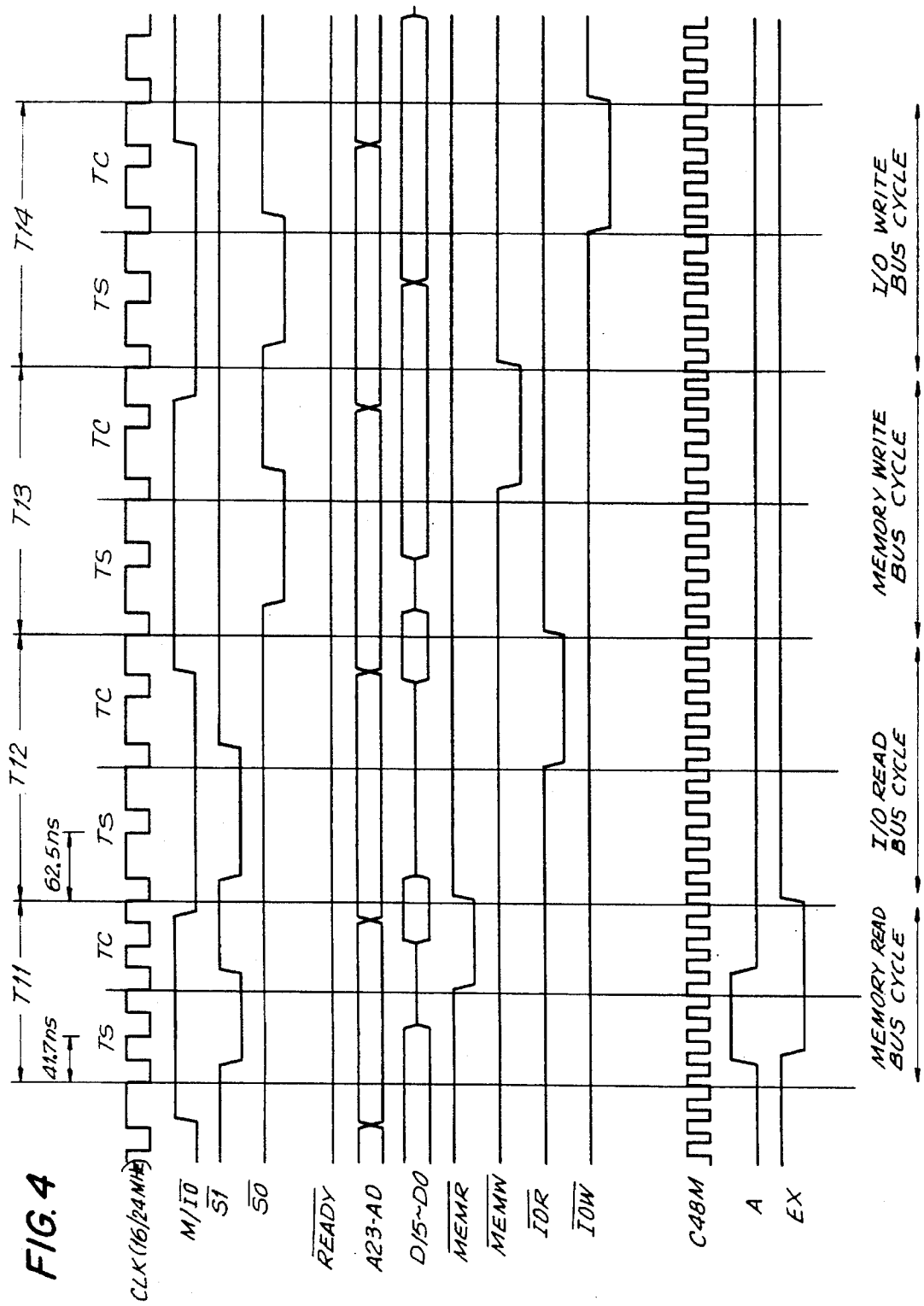
FIG. 4 is a timing chart of various signals produced by the data processing apparatus of FIG. 3(a)

Referring to FIG. 4, the CLK signal has a frequency of 24 MHz only during memory read bus cycle T11 and is at a frequency of 16 MHz during memory write bus cycle T13 and I/O read bus cycle T12 and I/O write bus cycle T14. Different frequencies of the CLK signal are set for memory read bus cycle T11 and memory write bus cycle T13 to obtain different access times. The frequency of the CLK signal is set so that the memory read access time is shorter than the memory write access time. If desired, the memory write access time can be made shorter than the memory read access time.

Data processing apparatuses 200 and 300 change the frequency of the CLK signal based on the type of bus cycle. Frequencies of the CLK signal are decreased during the I/O bus cycle and can be made to vary between the memory read bus cycle and memory write bus cycle with respect to the same memory, if desired. The frequency of the CLK signal also can be decreased to control the running time when checking for interrupts in an interrupt-acknowledge cycle (M/$\overline{\text{IO}}$=0, $\overline{\text{S1}}$=0, $\overline{\text{S0}}$=0).

As shown in FIG. 5, a data processing unit 400 in accordance with another alternative embodiment of the invention includes an oscillator 3 providing an oscillating signal of 48 MHz supplied to a clock pulse generator circuit 10. Oscillator 3 receives the CLK signal produced by clock pulse generator circuit 10 and provides the M/$\overline{\text{IO}}$, $\overline{\text{S1}}$ and $\overline{\text{S2}}$ signals and address signals (A16–A23) to clock pulse generator 10. The CLK signal produced by clock pulse generator circuit 10 has a frequency which is less than 48 MHz. Signals M/$\overline{\text{IO}}$, $\overline{\text{S1}}$ and $\overline{\text{S0}}$ produced by CPU 1 identify the bus cycle of CPU 1. The relationship between the M/$\overline{\text{IO}}$, $\overline{\text{S1}}$ and $\overline{\text{S0}}$ signals and bus cycles is illustrated in FIG. 16. Address outputs A16–A23 represent an 8 bit address bus. Clock pulse generator circuit 10 identifies the type of bus cycle and address location of data to be processed by CPU 1 by monitoring signals M/I0, S1 and S0 and address outputs A23–A16. A division of the 48 MHz oscillating frequency provided by oscillator 3 is dynamically performed (switched) based on signals M/$\overline{\text{IO}}$, $\overline{\text{S1}}$ and $\overline{\text{S0}}$ and outputs A23-A16.

Figure 6:
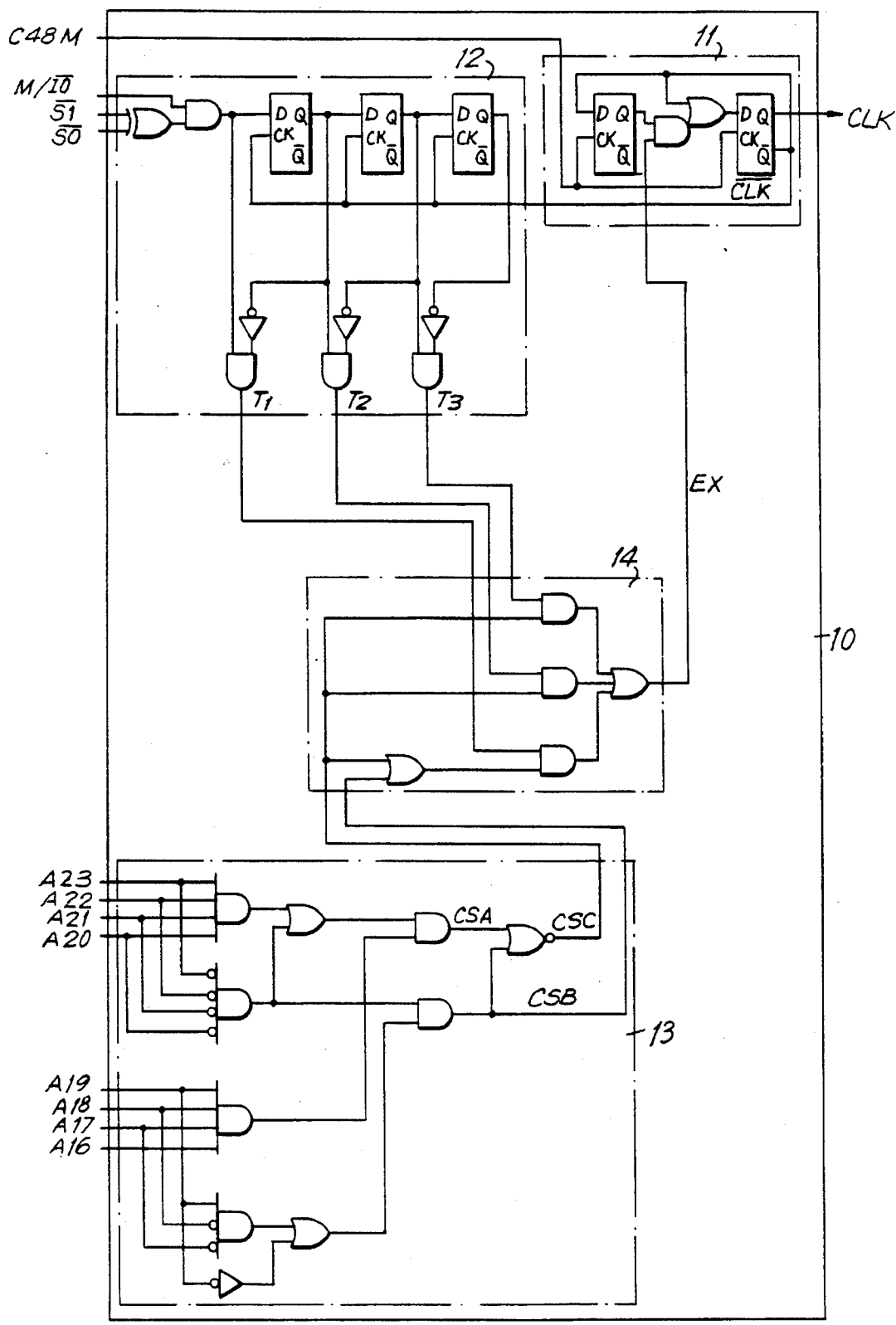
FIG. 6 is a schematic diagram of a clock pulse generator circuit of FIG. 5.

As shown in FIG. 6, clock pulse generator circuit 10 includes an address decoder 13 which produces signals CSA, CSB and CSC based on the logic levels of address outputs A16–A23 of CPU 1. Circuit 10 also includes a frequency divider 11, a clock timing circuit 12 and a frequency divider control circuit 14. The waveforms produced by unit 400 are shown in FIG. 7 and are summarily illustrated in FIGS. 8(a) and 8(b). FIGS. 8(a) and 8(b) illustrate a read cycle without a wait step and a write cycle with a wait step.

The basic bus cycle of CPU 1 without a wait step includes one clock cycle TS and one clock cycle TC as shown in FIG. 8(a). When the READY signal is at a low logic level at the end of clock cycle TC the basic bus cycle ends without including a wait step. When the READY signal is at a high logic level at the end of the TC clock cycle, an additional TC cycle is added. Only when the READY signal assumes a low logic level is the bus cycle completed. Signals S1 and S0 are produced during clock cycle TS. Signal M/$\overline{\text{IO}}$ and outputs A23–A0 are produced when the pulses of the CLK signal fall before the bus cycle begins. Suitable values for the M/$\overline{\text{IO}}$ signal and outputs A23-A0 are produced during the first half of the first clock cycle TC. Near the end of the read cycle, data is fetched in CPU 1 and held until the first pulse of the CLK signal occurs during in the next bus cycle.

Referring once again to FIG. 6, frequency divider circuit 11 of clock pulse generator circuit 10 is a ⅔ frequency divider which divides an oscillating signal C48M by a factor 2 or 3 depending on the logic level of control signal EX. When control signal EX is at a high logic level, frequency divider circuit 11 divides signal C48M by a factor 3 to produce a CLK signal having a frequency of 16 MHz. When control signal EX is at a low logic level, frequency divider circuit 11 divides signal C48M by a factor of 2 to produce a CLK signal having a frequency of 24 MHz. Clock timing circuit 12 produces timing signals T1, T2 and T3 during memory read bus cycle and memory write bus cycle.

Memory address mapping is illustrated in FIG. 9. Addresses 0F0000 through 0FFFFF and FF0000 through FFFFFF (i.e. address region A) are for use with an EPROM having a cycle time of 150 ns. Addresses 000000 through 09FFFF (i.e. address region B) are for use in a DRAM having a cycle time of 180 ns. Addresses other than 000000-09FFFF (i.e. address region C) are for use in a DRAM having a cycle time of 210 ns. Address regions A, B and C can be temporarily accessed during a memory read bus cycle.

FIG. 7 illustrates the memory read bus cycles with respect to address regions A, B and C. During the first memory read bus cycle which is with respect to address region B, signal CSB assumes a high logic level and signal CSC assumes a low logic level. Frequency divider control circuit 14 permits only timing signal T1 to pass therethrough. Accordingly, control signal EX assumes a high logic level only during the first half of clock cycle TS as shown in FIG. 7. Frequency divider circuit 11 divides signal C48M by a factor of 3 whereby the CLK signal has a frequency of 16 MHz. Frequency division by circuit 11 is judged at a point of control signal EX denoted by ex 1.

The first half of clock cycle TS referred to as period $t_1$ includes three clock pulses of signal C48M. The second half of clock cycle TS and the first and second halves of clock cycle TC are identified by periods $t_2$, $t_3$ and $t_4$, respectively. During the second half of clock cycle TS and clock cycle TC spanning periods $t_2$, $t_3$ and $t_4$, control signal EX assumes a high logic level which is judged by frequency divider circuit 11 at points ex2, ex3 and ex4, respectively. Frequency divider circuit 11 during periods $t_2$, $t_3$ and $t_4$ divides signal C48M by a factor of 2 to produce a CLK signal having a frequency of 24 MHz. Periods $t_2$, $t_3$ and $t_4$ are reduced to two clock pulses of signal C48. Therefore, the memory read bus cycle with respect to address region B (i.e. bus cycle number 1) includes 9 clock pulses of signal C48M. A standard bus cycle of 166.7 ns (without any wait steps) is used when frequency divider circuit 11 operates to divide signal C48M by a factor of 2 throughout the entire bus cycle and includes eight pulses of signal C48M. By adding one additional clock pulse, bus cycle 1 number covers a time interval of 187.5 ns and is equivalent to a 0.25 wait step standard bus cycle (i.e. 0.25×83.3 ns+166.7 ns).

Bus cycle number 2 which is a memory read bus cycle with respect to address location A occurs when signals CSB and CSC are both at low logic levels. Control signal EX is at a low logic level at all times. Frequency divider circuit 11 operates to divide signal C48M by a factor of 2 to produce a CLK signal of 24 MHz. Bus cycle number 2 is the same as the standard bus cycle of 166.7 ns without any wait step.

Bus cycle number 2 has a clock cycle TS including two time periods $t_5$ and $t_6$ and one clock cycle TC having two time periods $t_7$ and $t_8$. Time periods $t_5$, $t_6$, $t_7$ and $t_8$ each include two clock pulses of signal C48M.

Bus cycle number 3 which is a memory read bus cycle with respect to address region C occurs when CSB is at a low logic level and signal CSC is at a high logic level. Control signal EX assumes a high logic level when timing signals T1, T2 or T3 are at a high logic level. With control signal EX at a high logic level, frequency divider circuit 11 divides signal C48M by a factor of 3 to produce a CLK signal having a frequency of 16 MHz. Bus cycle number 3 includes one clock cycle TS having two time periods $t_9$ and $t_{10}$ and one clock cycle TC having two time periods $t_{11}$ and $t_{12}$. Time periods $t_9$, $t_{10}$ and $t_{11}$ each have three clock pulses of signal C48M. During the latter half of clock cycle TC (i.e. time period $t_{12}$), control signal EX assumes a low logic level. Accordingly, period $t_{12}$ includes only two clock pulses of signal C48M.

Bus cycle number 3 includes eleven pulses of signal C48M and encompasses a time interval of approximately 229.1 ns which is the equivalent of a 0.75 wait step (i.e. 0.75×83.3 ns+166.7 ns) based on a standard bus cycle of 166.7 ns. Frequency divider circuit 11 determines whether to divide signal C48M by a factor of 2 or 3 according to points ex1–ex12 of control signal EX. Each bus cycle, the number of wait steps and the bus cycle times are summarized in the table of FIG. 9.

As can be readily appreciated, a conventional data processing unit when accessing data from address region B or address region C requires 1-wait step whereas in accordance with the invention a 0.25 wait step and a 0.75 wait step are required, respectively. Address region A requires no wait steps for either a conventional data processing unit or a unit in accordance with the invention. Assuming access frequencies against address locations A, B and C are 40% and 20%, respectively, the mean bus cycle time is 187.5 ns in accordance with the invention and 216.7 ns for a conventional data processing unit (i.e. 0.4× 166.7+0.4×187.5+0.2×329.1= 187.5 ns; 0.4×166.7+0.4× 250+0.2×250=216.7 ns). The mean bus cycle time of 187.5 ns in accordance with the invention is the equivalent a 0.25 wait step whereas the 216.7 ns mean bus cycle time of the conventional data processing unit is the equivalent of a 0.60 wait step. When using the same memory data, the invention provides an improved bus cycle time of 10–15%.

As shown in FIG. 10, clock pulse generator circuit 10a can produce even smaller wait steps in accordance with a further alternative embodiment of the invention. The smaller wait steps are provided by increasing the oscillating frequency whereby a 0.125 wait step is produced. An oscillating signal C96M having a frequency of 96 MHz is supplied to the clock inputs of three flip flops 351, 352 and 353 of a frequency divider circuit 11a. The clock timing circuit 12, address decoder 13 and frequency divider control circuit 14 are constructed and operate in the same manner as discussed heretofore in connection with FIG. 6. Frequency divider circuit 11a divides signal C96M by a factor of 4 or 5 (i.e. ⅘ frequency divider). Division of signal C96M by a factor of 5 occurs when control signal EX assumes a high logic level and by a factor of 4 when control signal EX assumes a low logic level. The CLK signal produced by frequency divider circuit 11a has a frequency of 19.2 MHz and 24 MHz when control signal EX is at a high logic level and a low logic level, respectively.

FIG. 11 illustrates the operation of clock pulse generator circuit 10a during a memory read bus cycle with respect to address region B. Clock cycle TS includes two periods $t_{101}$ and $t_{102}$ corresponding to the first and second halves of clock cycle TS. During the first half of clock cycle TS (i.e. period $t_{101}$) control signal EX assumes a high logic level and during the second half of clock cycle TS (i.e. period $t_{102}$) control signal EX assumes a low logic level. Clock cycle TC also includes two periods $t_{103}$ and $t_{104}$ corresponding to the first and second halves of clock cycle TC. Control signal EX is at a low logic level during periods $t_{103}$ and $t_{104}$ of the memory bus cycle. The pattern of when control signal EX assumes a high logic level relative to the clock cycle is similar to the pattern of EX in bus cycle no. 1 of FIG. 7.

When control signal EX assumes a high logic level, frequency divider circuit 11a divides signal C96M by a factor of 5. Outputs $Q_0$, $Q_1$ and $Q_2$, ($Q_0$, $Q_1$, $Q_2$) of flip flops 351, 352 and 353 switch from logic levels of (0, 0, 0) to (1, 0, 0) to (1, 1, 1) to (0, 1, 1) to (0, 0, 1). Output $Q_2$ serves as CLK signal of clock pulse generator circuit 10a. Period $t_{101}$ is 52.1 ns. One clock pulse of signal C96M is 10.4 ns. When control signal EX is at a low logic level outputs $Q_0$, $Q_1$ and $Q_2$ ($Q_1$, $Q_2$, $Q_3$) change from a logic level of (0, 0, 0) to (1, 0, 0) to (1, 1, 1) to (0, 1, 1). With control signal EX at a low logic level frequency divider circuit 11a divides signal C96M by a factor of 4. Periods $t_{102}$, $t_{103}$ and $t_{104}$ are each 41.6 ns. The memory bus cycle with respect to address region B is 177.1 ns which is equivalent to a 0.125 wait step based on the standard bus cycle time of 166.7 ns. Frequency divider circuit 11a judges by which factor it is to divide signal C96M based on the value of control signal EX at points ex101, ex102, ex103 and ex104.

The wait step can be reduced to very small values in accordance with the invention as compared to conventional methods by partially extending the number of pulses of the CLK signal supplied to CPU 1. Extremely fine adjustment of bus cycle time to extend the bus cycle, as desired, is provided in accordance with the invention. CPU bus cycle time can be set to correspond to the cycle time of the memory device being used so that efficient use of the memory device and significantly improved processing speed are realized. Although the invention has been described with respect to FIGS. 5–11 in connection with a memory bus cycle, it is to be understood that the invention can be similarly applied with respect to an I/O bus cycle whether at a low or high operating speed.

As shown in FIG. 12, a data processing apparatus 500 in accordance with yet another alternative embodiment of the invention provides wait steps of 1.25, 1.50 and 1.75. Those elements in FIG. 12 constructed and operating in the same manner as shown in FIG. 5 are identified by like reference numerals. A READY control circuit 15 provides a READY signal to a $\overline{\text{READY}}$ input of CPU 1. Operation of unit 500 is illustrated in FIGS. 13(a), 13(b) and 13(c). When the READY signal of FIG. 13(a) is at a low logic level, control signal EX is also at a low logic level. The bus cycle time is 166.7 ns.

When the control signal EX is at a high logic level during the first half of clock cycle TS, the period of pulses of CLK signal can be extended by one pulse to produce a 0.25 wait step as discussed above in connection with bus cycle no. 1 of FIG. 7. As shown in FIG. 13(b), when the READY signal also assumes a high logic level during the first clock cycle TC, the bus cycle is extended by an additional one wait step period. Accordingly, the complete bus cycle is 270.8 ns (i.e., 1.25 wait steps).

When control signal EX is at a high logic level during both the first and second halves of clock cycle TS, the period of pulses of the CLK signal is extended by two pulses equivalent to a 0.5 wait step. As shown in FIG. 13(c), when the READY signal is also at a high logic level during the first clock signal TC, the period once again can be extended by an additional one wait step. Accordingly, the complete bus cycle is extended by 1.50 wait steps, that is, 291.7 ns.

Precise adjustments to extend the bus cycle by more than one wait step also can be made by controlling the READY signal supplied to CPU 1 and by changing the frequency of some or all of the pulses of the CLK signal supplied to the CPU. By combining the different methods (i.e. embodiments) described heretofore, the speed at which interleave memory access, high speed paging memory access and static column memory access are performed can be increased. Other access methods to increase operating speed also can be realized by employing the methods of the invention. No wait step is provided in the methods of the invention when a hit takes place, however, 1 or 2 wait steps are provided when no hit takes place. Therefore, if a hit does not take place a wait step to speed up existing high speed memory access methods (e.g. interleave, high speed paging and static column memory access methods) can be employed. The wait steps can vary by 0.25, 0.50, 0.75, 1.25 or 1.50. Other wait step values can be realized by changing the oscillating frequency and/or length of time that the READY signal is at a high logic level in accordance with the invention.

Quick or slow access areas can be set by setting arbitrary addresses to be identified by address identification circuit 13. During certain bus cycles the wait step can be changed to a CLK signal at a fixed frequency for all addresses. Although the embodiments described above employ frequency divider circuits which divide the oscillating signal by factors of 2, 3, 4 or 5, it is to be understood that several different types of oscillators can be used to provide the required frequency.

As shown in FIG. 14(a), a data processing apparatus 600 in accordance with still another alternative embodiment of the invention controls the frequency of the CLK signal applied to CPU 1 based on line voltage and/or ambient temperature. Apparatus 600 includes CPU 1, a clock controlling section 40, a memory controlling section 50 and a I/O device controlling section 51. Clock controlling section 40 includes a voltage detecting section 41, a temperature detecting section 42 and a variable oscillating circuit 43. A line 1001, which serves as the input to voltage detecting section 41, is connected to a power supply (not shown) for the devices in apparatus 600 and is nominally within a range of 4.75 volts to 5.25 volts. Voltage detecting section 41 detects the line voltage, that is, measures the voltage of line 1001 and then converts the same to a digital value supplied to variable oscillating circuit 43 along a line 1002. Temperature detecting section 42 detects ambient temperature conditions using, for example, a thermistor. When using a thermistor, the electrical resistance thereof varies in accordance with ambient temperature conditions. A digitized value representing the detected ambient temperature is supplied to variable oscillating circuit 43 along a line 1004. Variable oscillating circuit 43 varies its output frequency based on the detected line voltage and ambient temperature conditions shown in FIGS. 14(b) and 14(c), respectively. A clock signal having a frequency corresponding to the line voltage and/or ambient temperature from variable signal oscillator 43 outputted along line 1005 is supplied to CPU 1.

CPU 1, memory controlling section 50 and I/O device controlling section 51 are formed from a large scale integration (LSI) chip which has an operating frequency dependent on line voltage and the ambient temperature. The operating frequency can vary by approximately 20% when the ambient temperatures vary between 0° C.–40° C. and the line voltages vary between 4.75–5.25 volts. By varying the frequency of the CLK signal by about 20%, unit 600 operates much more efficiently.

FIG. 14(b) illustrates the access time—line voltage characteristics of apparatus 600. Assuming a line voltage of 5.00 volts is standard (i.e., corresponding to an access time of 1.0), the access time will be 0.95 when the line voltage is 5.25 volts and 1.05 when the line voltage is 4.75 volts. In other words, access time, which is proportional to the delayed time of the bus cycle running time of the CPU, is increased by 5% or decreased by 5% when the line voltage is 5.25 volts and 4.75 volts, respectively. As shown in FIG. 14(c) assuming an ambient temperature of 25° C. is standard (i.e., corresponding to an access time of 1.0), the access time will be 1.09 at an ambient temperature of 50° C. and 0.91 at an ambient temperature of 0° C. In other words, access time is decreased by 9% at an ambient temperature of 50° C. and increased by 9% at an ambient temperature of 0° C.

By controlling the frequency of CLK signal, the rate at which data is processed by a data processing apparatus in accordance with the invention can be increased by approximately 10% in a normal working environment of 25° C. at a line voltage of 5.0 volts. Up to now the frequency of the CLK signal has been fixed at 9 MHz so that operation could be guaranteed at 40° C. at a line voltage of 4.75 volts. In accordance with the invention, however, the optimum frequency of the CLK signal is determined based on the particular operating environment. For example, the frequency of the CLK signal will be 10 MHz at an ambient temperature of 25° C. and a line voltage of 5.0 volts. Processing speed increases by approximately 10% compared with the 9 MHz CLK signal employed in conventional data processing systems.

As now can be readily appreciated, the frequency of the CLK signal provided to a CPU can be dynamically changed based on the bus cycle and/or address. Therefore, during the bus cycle for an option slot, decreasing frequency of the CLK signal supplied to the CPU permits an extended board capable of operating at a high speed also to be compatible with existing extended boards which operate at a slower speed. In other words, the CPU can adjust its speed of operation to accommodate devices which have a high operating speed and a low operating speed while maintaining a high degree of efficiency. In particular, there is substantially no difference in the timing of signals in the option slot between new and old products. Extended boards produced for existing products can operate with new products.

The invention permits new products such as personal computers to be designed with a high degree of compatibility to existing goods (i.e., compatibility to extended boards). The invention also permits extremely small wait steps to be used by partially extending a clock cycle of a bus cycle rather than being forced to increment the bus cycle by one full wait step as employed by conventional wait step insertion (putting methods). Precise adjustment of the bus cycle is provided by the invention. The CPU bus cycle can be set to a predetermined memory bus cycle time to provide optimum performance so as to significantly reduce CPU processing time. The bus cycle can be set to be dependent on operating conditions (e.g., temperature and voltage) so that the rate that at which data in a data processing unit is processed is significantly increased.

It will thus be seen that the objects set forth above and those made apparent from the preceding description are efficiently attained and, since certain changes may be made in the above method in construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

What is claimed is:

1. A method for controlling the running time of a central processing unit which operates in accordance with a unit of a bus cycle, said bus cycle including at least one clock cycle and involves bus access, comprising:

determining, at or about the start of said bus cycle, if the bus cycle controlled by said central processing unit is a predetermined type of bus cycle;

producing at least one identifying signal indicating the predetermined bus cycle in accordance with the determination of the bus cycle type;

maintaining said at least one identifying signal in a constant logic state for a predetermined period;

varying a frequency of the clock signal of the central processing unit based on the at least one identifying signal; and adjusting a timing of a control signal which controls bus access at or about the varying of the frequency of the clock signal of the central processing unit;

whereby the running time for processing data by the central processing unit is adjusted in accordance with the bus cycle type.

2. The method for controlling the running time of claim 1, wherein the bus cycles include a memory read bus cycle and a memory write bus cycle and further including producing a first clock signal having a first frequency based on the memory read bus cycle and a second clock signal having a second frequency based on the memory write bus cycle whereby the lengths of time for the central processing unit to read data from and write data into a memory device are different.

3. A method for controlling the running time of different bus cycles of a central processing unit, comprising:

processing data during the different bus cycles based on the frequency of a clock signal supplied to the central processing unit; and varying the frequency of the clock signal continuously based on line voltage which is supplied to the central processing unit;

whereby the running time for processing data by the central processing unit is adjusted continuously in accordance with line voltage.

4. A data processing apparatus, comprising:

CPU means for producing command signals corresponding to a bus cycle which the CPU means is presently operating under in response to a clock signal; and clock generating means for producing the clock signal and responsive to line voltage conditions for varying the frequency of the clock signal continuously;

whereby the running time of the CPU means varies continuously based on line voltage conditions.

5. A method for controlling the running time of a central processing unit which operates in accordance with a unit of a bus cycle, said bus cycle including at least one clock cycle and involves bus access, comprising:

determining, at or about the start of said bus cycle, if said bus cycle controlled by said central processing unit is a predetermined type of bus cycle and determining, at or about the start of said bus cycle, whether an address accessed by said central processing unit is in a predetermined address range;

producing at least one identifying signal indicating the predetermined bus cycle and the predetermined address range access in accordance with the determination of the bus cycle type and address;

maintaining said at least one identifying signal in a constant logic state for a predetermined period;

varying a frequency of said clock signal of the central processing unit based on the identifying signal; and adjusting a timing of a control signal which controls bus access at or about the varying of the frequency of the clock signal of the central processing unit;

whereby the running time for processing data by the central processing unit is adjusted in accordance with the bus cycle type and address.

6. A data processing apparatus, comprising:

central processing unit means for accessing memory and at least one peripheral device in accordance with a bus cycle controlled by said central processing unit, said bus cycle including at least one clock cycle and involves bus access, determination means for determining, at or about the start of said bus cycle, if said bus cycle being processed by the central processing unit means is a predetermined type of bus cycle;

signal producing means for producing at least one identifying signal indicating the predetermined bus cycle in accordance with the determination of bus cycle type;

maintaining means for maintaining said at least one identifying signal in a constant logic state for a predetermined period;

frequency varying means for varying the frequency of the clock signal of the central processing unit based on the at least one identifying signal; and adjusting means for adjusting a timing of a control signal which controls bus access at or about the varying of the frequency of the clock signal of the central processing unit means;

whereby the running time of the central processing unit means varies based on the bus cycle type.

7. A data processing apparatus, comprising:

central processing unit means for accessing memory and at least one peripheral device in accordance with a bus cycle being controlled by said central processing unit, said bus cycle including at least one clock cycle and involves bus access;

determination means for determining at or about the start of said bus cycle if said bus cycle being controlled by the central processing unit means is a predetermined type of bus cycle and determining at or about the start of said bus cycle whether an address that is accessed by the central processing unit means is in a predetermined address range;

signal producing means for producing at least one identifying signal indicating the predetermined bus cycle and the predetermined address range access in accordance with the determination of the bus cycle type and address;

maintaining means for maintaining said at least one identifying signal in a constant logic state for a predetermined period;

frequency varying means for varying the frequency of the clock signal of the central processing unit based on the at least one identifying signal; and adjusting means for adjusting a timing of a control signal which controls bus access at or about the varying of the frequency of the clock signal of the central processing unit;

whereby the running time of the central processing unit means varies based on the bus cycle type and address.

8. A method for controlling the running time of a central processing unit which operates in accordance with a unit of a bus cycle, said bus cycle including at least one clock cycle and involves bus access, comprising:

determining, at or about the start of said bus cycle, if an address accessed by the central processing unit is in a predetermined address range;

producing at least one identifying signal indicating the predetermined address range access in accordance with the determination of address;

maintaining said at least one identifying signal in a constant logic state for a predetermined period;

varying a frequency of the clock signal of the central processing unit based on the identifying signal; and adjusting a timing of a control signal which controls bus access at or about the varying of the frequency of the clock signal of the central processing unit;

whereby the running time for processing data by the central processing unit is adjusted in accordance with the address accessed.

9. A data processing apparatus, comprising:

central processing unit means for accessing memory and at least one peripheral device in accordance with a bus cycle controlled by said central processing unit, said bus cycle including at least one clock cycle and involves bus access;

determination means for determining, at or about the start of said bus cycle, if an address accessed by the central processing unit means is in a predetermined address range;

signal producing means for producing at least one identifying signal indicating the predetermined address range access in accordance with the determination of address;

maintaining means for maintaining said at least one identifying signal in a constant logic state for a predetermined period;

frequency varying means for varying the frequency of the clock signal of the central processing unit means in accordance with the at least one identifying signal; and adjusting means for adjusting a timing of a control signal which controls bus access at or about the varying of the frequency of the clock signal of the central processing unit means;

whereby the running time of the central processing unit means varies based on the address accessed.

10. A data processing apparatus, comprising:

central processing unit means for accessing memory and at least one peripheral device in accordance with a bus cycle controlled by said central processing unit means, said bus cycle including at least one clock cycle and involves bus access;

determination means for determining, at or about the start of said bus cycle, if the bus cycle controlled by said central processing unit means is a predetermined type of bus cycle;

signal producing means for producing at least one identifying signal indicating the predetermined bus cycle in accordance with the determination of bus cycle type;

maintaining means for maintaining said at least one identifying signal in a constant logic state for a predetermined period;

extending means for extending at least one clock pulse period which, comprises said clock cycle based on the identifying signal; and adjusting means for adjusting a timing of a control signal which controls bus access at or about the extending of said at least one clock pulse period;

whereby the running time of the central processing unit means varies based on the bus cycle type.

11. A method for controlling the running time of a central processing unit which operates in accordance with a unit of a bus cycle, said bus cycle including at least one clock cycle and involves bus access, comprising:

determining, at or about the start of said bus cycle, if the bus cycle controlled by said central processing unit is a predetermined type of bus cycle;

producing at least one identifying signal indicating the predetermined bus cycle in accordance with the determination of bus cycle type;

maintaining said at least one identifying signal in a constant logic state for a predetermined period;

extending at least one clock pulse period which comprises said clock cycle based on the identifying signal; and adjusting the timing of a control signal which controls bus access at or about the extending of said at least one clock pulse period;

whereby the running time for processing data by the central processing unit is adjusted based on the bus cycle type.

12. A data processing apparatus, comprising:

central processing unit means for accessing memory and at least one peripheral device in accordance with a bus cycle being controlled by said central processing unit, said bus cycle including at least one clock cycle and involves bus access;

determination means for determining, at or about the start of said bus cycle, if the bus cycle controlled by said central processing unit means is a predetermined type of bus cycle and determining, at or about the start of said bus cycle, whether an address accessed by the central processing unit means is in a predetermined address range;

signal producing means for producing at least one identifying signal indicating the predetermined bus cycle and the predetermined address range access in accordance with the determination of the bus cycle type and address;

maintaining means for maintaining the at least one identifying signal in a constant logic level for a predetermined period;

extending means for extending at least one clock pulse period which comprises said clock cycle based on the at least one identifying signal; and adjusting means for adjusting a timing of a control signal which controls bus access at or about the extending of said at least one clock pulse period;

whereby the running time of the central processing unit means varies based on the bus cycle type and address.

13. A method for controlling the running time of a central processing unit which operates in accordance with a unit of a bus cycle, said bus cycle including at least one clock cycle and involves bus access, comprising:

determining, at or about the start of said bus cycle, if the bus cycle controlled by said central processing unit is a predetermined type of bus cycle and determining, at or about the start of said bus cycle, whether an address accessed by the central processing unit is in a predetermined address range;

producing at least one identifying signal indicating the predetermined bus cycle and the predetermined address range access in accordance with the determination of bus cycle type and address;

maintaining the at least one identifying signal in a constant logic state for a predetermined period;

extending at least one clock pulse period which comprises said clock cycle based on the at least one identifying signal; and adjusting the timing of the control signal which controls bus access at or about the extending of said at least one clock pulse period;

whereby the running time for processing data by the central processing unit is adjusted based on the bus cycle type and address.

14. A method for controlling the running time of a central processing unit which operates in accordance with a unit of a bus cycle, said bus cycle including at least one clock cycle and involves bus access, comprising:

determining, at or about the start of said bus cycle, if an address accessed by the central processing unit is in a predetermined address range;

producing at least one identifying signal indicating the predetermined address range access in accordance with the determination of address;

maintaining the identifying signal in a constant logic state for a predetermined period;

extending at least one clock pulse period which comprises said clock cycle based on the identifying signal; and adjusting the timing of a control signal which controls bus access at or about the extending of said at least one clock pulse;

whereby the running time for processing data by the central processing unit is adjusted based on the address accessed.

15. A data processing apparatus, comprising:

central processing unit means for accessing memory and at least one peripheral device in accordance with a unit of a bus cycle being controlled by the central processing unit, said bus cycle including at least one clock cycle and involves bus access;

determination means for determining, at or about the start of said bus cycle, if an address accessed by the central processing unit means is in a predetermined address range;

signal producing means for producing at least one identifying signal indicating the predetermined address range access in accordance with the determination of address;

maintaining means for maintaining the identifying signal in a constant logic state for a predetermined period;

extending means for extending at least one clock pulse period which comprises said clock cycle based on the at least one identifying signal; and adjusting means for adjusting the timing of the control signal which controls bus access at or about the extending of said at least one clock pulse period;

whereby the running time of the central processing unit means varies based on the address accessed.

16. A method for controlling the running time of a central processing unit which operates in accordance with a unit of a bus cycle, said bus cycle including at least one clock cycle and involves bus access, comprising:

determining, at or about the start of said bus cycle, if said bus cycle controlled by the central processing unit is a predetermined type of bus cycle;

producing at least one identifying signal indicating the predetermined bus cycle in accordance with the determination of bus cycle type;

maintaining the at least one identifying signal in a constant logic state for a predetermined period;

extending the period of M clock pulses of said clock cycle comprising N clock pulses (M being an integer, $M \leq N$) based on the identifying signal; and adjusting the timing of a control signal which controls bus access at or about the extending of said period of M clock pulses of said clock cycle;

whereby the running time for processing data by the central processing unit is adjusted based on the bus cycle type.

17. The method as claimed in claim 16, including setting the value of said integer M based on a computer program.

18. A method for controlling the running time of a central processing unit which operates in accordance with a unit of a bus cycle, said bus cycle including at least one clock cycle and involves bus access, comprising:

determining, at or about the start of said bus cycle, if said bus cycle controlled by the central processing unit is a predetermined type of bus cycle and determining, at or about the start of said bus cycle, whether an address accessed by the central processing predetermined address range;

unit is in a producing at least one identifying signal indicating the predetermined bus cycle and the predetermined address range access in accordance with the determination of bus cycle type and address;

maintaining the at least one identifying signal in a constant logic state for a predetermined period;

extending the period of M clock pulses of said clock cycle comprising N clock pulses (M being an integer, $M \leq N$) based on the identifying signal; and adjusting the timing of a control signal which controls bus access at or about the extending of said period of M clock pulses of said clock cycle;

whereby the running time for processing data by the central processing unit is adjusted based on the bus cycle type and address.

19. A method for controlling the running time of a central processing unit which operates in accordance with a unit of a bus cycle, said bus cycle including at least one clock cycle and involves bus access, comprising:

determining, at or about the start of said bus cycle, if an address accessed by the central processing unit is in a predetermined address range;

producing at least one identifying signal indicating the predetermined address range access in accordance with the determination of address;

maintaining the identifying signal at a constant logic level for a predetermined period;

extending the period of M clock pulses of said clock cycle comprising N clock pulses (M being an integer, M≦N) based on the at least one identifying signal; and adjusting the timing of a control signal which controls bus access at or about the extending of said period of M clock pulses of said clock cycle;

whereby the running time for processing data by the central processing unit is adjusted based on the address accessed.

20. A data processing apparatus, comprising:

central processing unit means for accessing memory and at least one peripheral device based on a bus cycle controlled by said central processing unit means, said bus cycle including at least one clock cycle and involves bus access;

determination means for determining, at or about the start of said bus cycle, if said bus cycle controlled by said central processing unit means is a predetermined type of bus cycle;

signal producing means for producing at least one identifying signal representing the predetermined bus cycle in accordance with the determination of bus cycle type;

maintaining means for maintaining the at least one identifying signal in a constant logic state for a predetermined period;

extending means for extending the period of M clock pulses of said clock cycle comprising N clock pulses (M being an integer, M≦N) based on the at least one identifying signal; and adjusting means for adjusting the timing of a control signal which controls bus access at or about the extending of said period of M clock pulses of said clock cycle;

whereby the running time of the central processing unit means varies based on the bus cycle type.

21. A data processing apparatus, comprising:

central processing unit means for accessing memory and at least one peripheral device in accordance with a unit of a bus cycle, said bus cycle including at least one clock cycle and involves bus access;

determination means for determining, at or about the start of said bus cycle, if said bus cycle controlled by said central processing unit means is a predetermined type of bus cycle and determining, at or about the start of said bus cycle, whether an address accessed by the central processing unit means is in a predetermined address range;

signal producing means for producing at least one identifying signal indicating the predetermined bus cycle and the predetermined address range access in accordance with the determination of the bus cycle type and address;

maintaining means for maintaining the at least one identifying signal at a constant logic level for a predetermined period;

extending means for extending the period of M clock pulses of said clock cycle comprising N clock pulses (M being an integer, M≦N) based on the at least one identifying signal; and adjusting means for adjusting the timing of the control signal which controls bus access at or about the extending of said period of M clock pulses of said clock cycle;

whereby the running time of the central processing unit means varies based on the bus cycle type and address.

22. A data processing apparatus, comprising:

central processing unit means for accessing memory and at least one peripheral device in accordance with a unit of a bus cycle, said bus cycle including at least one clock cycle and involves bus access;

determination means for determining, at or about the start of said bus cycle, if an address accessed by the central processing unit means is in a predetermined address range;

signal producing means for producing at least one identifying signal indicating the predetermined address range access in accordance with the determination of address;

maintaining means for maintaining the identifying signal at a constant logic level for a predetermined period;

extending means for extending the period of M clock pulses of said clock cycle comprising N clock pulses (M being an integer, M≦N) based on the at least one identifying signal; and adjusting means for adjusting the timing of a control signal which controls bus access at or about the extending of said period of M clock pulses of said clock cycle;

whereby the running time of the central processing unit means varies based on the address accessed.

23. The method as claimed in claim 3, wherein the frequency of the clock signal is increased when the line voltage is high and the frequency of the clock signal is decreased when the line voltage is low.

24. The data processing apparatus as claimed in claim 4, wherein the frequency of the clock signal is increased when the line voltage is high and the frequency of the clock signal is decreased when the line voltage is low.

\* \* \* \* \*